(12) United States Patent
Mase

(10) Patent No.: US 8,382,300 B2
(45) Date of Patent: Feb. 26, 2013

(54) LIGHT-TRANSMITTING MEMBER

(75) Inventor: Keiji Mase, Tokyo (JP)

(73) Assignee: Fuji Manufacturing Co., Ltd., Tokyo (JP)

( * ) Notice: Subject to any disclaimer, the term of this patent is extended or adjusted under 35 U.S.C. 154(b) by 114 days.

(21) Appl. No.: 13/158,677

(22) Filed: Jun. 13, 2011

(65) Prior Publication Data

US 2012/0002290 A1      Jan. 5, 2012

(30) Foreign Application Priority Data

Jul. 2, 2010      (JP) .................................. 2010-151957

(51) Int. Cl.
   *G02B 5/08*      (2006.01)
   *G02B 7/182*      (2006.01)
(52) U.S. Cl. ........................................ 359/839; 359/883
(58) Field of Classification Search .................. 359/839
   See application file for complete search history.

(56) References Cited

FOREIGN PATENT DOCUMENTS

JP      2009204706 A      9/2009

*Primary Examiner* — Jade R Chwasz
(74) *Attorney, Agent, or Firm* — Porzio, Bromberg & Newman, P.C.

(57) ABSTRACT

The present invention provides a light-transmitting member that not only exhibits high antiglare properties but also shows a transmission image with a sharp outline. A reflecting surface of a light-transmitting member formed of an optically transparent material, for example, a glass plate, has minute hubbly surface profile formed therein by blasting the reflecting surface with an abrasive or the like to mill the surface. The minute hubbly surface profile in the reflecting surface are formed so that, when the reflecting surface is divided into minute compartments of a prescribed size and a histogram is constructed on the basis of measurement values obtained by measuring the height in each compartment, the probability density of the mode in the histogram is 10 to 30%, and the variance ($\sigma^2$) in the histogram, calculated on the basis of the heights, is less than 0.4 ($\mu m^2$).

8 Claims, 36 Drawing Sheets

FLAT PORTION

FLAT PORTION

Example 1
Nano A

Example 2
Nano B 10 mm

Example 3

Nano C

10mm

Example 4
Nano E

Example 5
Nano G 10 mm

Example 6

AR#1200

10 mm

Example 7

Example 8
AR#2000

10 mm

Example 9

Example 10
WA#1000(60%)

Example 11

WA#1000(60%)+WAA#3000

10mm

Example 12
WA#1000 (80%)

10 mm

Comparative Example 1
WA#1000(80%) + WAA#3000

1 0 mm

Comparative Example 2
Nono F 10 mm

Comparative Example 3
Nono H

20mm

Comparative Example 4
Nano I 1 0 mm

Comparative Example 5
Nano J 10 mm

Comparative Example 6
AR46

Comparative Example 7
AR#60

Comparative Example 8
AR#100

1 0 mm

Comparative Example 9
AR#150

10mm

Comparative Example 10

Comparative Example 11
WA#100

0 mm

Comparative Example 12

WA#220

0 mm

Comparative Example 13

LIGHT-TRANSMITTING MEMBER

CROSS-REFERENCE TO RELATED APPLICATION

This application claims priority on JP2010-151957 filed Jul. 10, 2010, the disclosure of which is hereby incorporated in its entirety by reference into this application.

BACKGROUND OF THE INVENTION

1. Field of the Invention

The present invention relates to light-transmitting members, and more particularly, to light transmitting members formed of optically transparent materials, for example, glass, quartz, or transparent resins etc., such as acrylic and polycarbonate (PC), and to light-transmitting members featuring a surface structure that can inhibit specular reflection at the surface while maintaining the transparency of a transparent plate, for example, a glass plate.

2. Description of the Related Art

To eliminate the annoyance or reduce the drop in visibility caused by light reflected at the surface of an object etc. getting into the viewer's visual field, in various fields, antiglare treatment is performed for suppressing glare at the object's surface by diffusely reflecting the light incident on the object's surface.

Examples of articles that are subjected to this kind of antiglare treatment include television screens, displays screens of computers, and liquid crystal displays built into various kinds of portable electronic equipment as monitors, such as digital cameras, digital video cameras, mobile telephones, car navigation systems, and so forth.

In these kinds of liquid crystal displays, indoor lighting, sunlight, etc. producing glare at the surface thereof causes a considerable drop in visibility. In particular, with the liquid crystal displays built into portable electronic equipment used outdoors, in order to maintain visibility under highly bright light such as sunlight, it is necessary to use a high-brightness backlight, which results in heavy battery consumption.

Therefore, in order to prevent such glare and maintain image visibility, the main approach is to use so-called semitransparent display devices in the case of liquid crystal displays.

These semitransparent display devices have an antireflection film, which is made translucent, for example, by forming minute indentations and protrusions on the surface of a transparent film, attached to the surface of glass substrates holding liquid crystal therebetween or to the inner side of the glass substrates, and prevent glare at the screen by diffusely reflecting incident light with minute indentations and protrusions formed on the surface of the antireflection film.

To control the reflection direction of the light without using this kind of antireflection film, a light-transmitting optical component has been proposed, which is an optical component formed of transparent resin to allow transmission of light and which has nanometer-order indentations and protrusions in at least one surface of the light-incident surfaces thereof (see claim 1 of Japanese Unexamined Patent Application, Publication No. 2009-204706).

Even in a liquid crystal display subjected to the antiglare treatment described above, if the minute indentations and protrusions formed in the antireflection film etc. are formed regularly, with a light source exhibiting parallelism, such as sunlight, rainbow-like interference colors appear at the surface to due to the interference phenomenon at the indentations and protrusions. The generation of these interference colors causes a decrease in visibility.

Methods that have been proposed as countermeasures against this interference phenomenon include making the hubbly surface profile formed on the reflecting surface of the antireflection film etc. or the surface profile of the antireflection film itself random, diffusing the interference light into irregular light with a diffuser disposed in front of the reflecting surface, and so forth.

To bring about antiglare properties by attaching an antireflection film having minute indentations and protrusions etc. in the surface thereof to the surface of a transparent plate formed of glass, quartz, acrylic, polycarbonate or the like, or by causing diffuse reflection by forming minute indentations and protrusions directly on the surface of the transparent plate, the diffuse reflection caused by the indentations and protrusions formed in the surface of the antireflection film not only reduces the specular reflection of lighting or sunlight but also causes diffuse reflection of the light passing through the transparent plate. Therefore, when this structure is employed in liquid crystal displays and so forth, the outline of the displayed image becomes blurred, and the quality of the image that can be displayed by the display device is decreased.

In addition, when the formation of the indentations and protrusions for causing diffuse reflection is achieved by attaching an antireflection film having minute indentations and protrusions formed therein to the surface as described above, it is necessary to attach the antireflection film to the transparent plate so as not to trap any air between them. Not only is this task complicated, but also in some cases the image becomes even more blurred because of a refractive index difference due to the different materials of the antireflection film and the transparent plate, which causes a further reduction in the quality of the image that can be displayed by the display device.

The present invention has been conceived to eliminate the problems with the related art described above, and an object thereof is to provide a surface structure of a light-transmitting member that can display a transmission image with a sharp outline while exhibiting high antiglare properties, and that can thus maintain the sharpness of the transmission image.

SUMMARY OF THE INVENTION

To achieve the above-described object, the present invention provides a light-transmitting member in which minute hubbly surface profile including indentations and protrusions are formed in a reflecting surface of the light-transmitting member, which is formed of an optically transparent material, the indentations and protrusions in the reflecting surface being formed so that, when the reflecting surface is divided into minute compartments of a prescribed size and a histogram is constructed on the basis of measurement values obtained by measuring the height of each compartment (the height with reference to a zero point defined as the height of the deepest part of the valleys appearing in the surface with the indentations and protrusions), the probability density of the mode in the histogram is 10 to 30%, and the variance ($\sigma^2$) in the histogram, calculated on the basis of the heights, is less than 0.4 ($\mu m^2$).

The compartment can be defined as a compartment corresponding to one pixel in a 1000-times magnification image acquired by imaging the reflecting surface, for example, a square with each side length of 0.2913 μm in the actual reflecting surface.

The surface roughness of the reflecting surface, in terms of Ra, is 0.5 μm or less, preferably 0.3 μm or less, and more preferably 0.23 μm or less.

The surface roughness of the reflecting surface, in terms of Rz, is 3 μm or less, preferably 2 μm or less, and more preferably 1.6 μm or less.

Here, the surface roughnesses Ra and Rz are as defined by JIS B0601-1994. The measurement device used in the Examples was a "Surfcom 1400" (Tokyo Seimitsu Co., Ltd.), having the following measurement specifications: measurement stylus diameter, 5 μm; cut-off 0.8 mm.

The light-transmitting member may be a transparent plate, in which case, the reflecting surface is preferably formed on one surface of the transparent plate. This, however, does not preclude forming the reflecting surface on both surfaces thereof.

The above-described light-transmitting member having the reflecting surface formed thereon has a parallel transmittance of 2% or more, a haze value of 20 to 70%, and a reflectance of 7% or less at all wavelengths.

With the structure of the present invention described above, it is possible to realize a light-transmitting member that maintains sufficient transparency allowing seven or more complete dark rings to be observed in all cases in experiments to confirm the visibility using circular zone plates and that is provided with antiglare properties due to the lower reflectance and improved haze value.

BRIEF DESCRIPTION OF THE DRAWINGS

The objects and advantages of the invention will become apparent from the following detailed description of preferred embodiments thereof provided in connection with the accompanying drawings in which.

DETAILED DESCRIPTION OF THE PREFERRED EMBODIMENTS

Next, preferred embodiments of the present invention will be described below with reference to the attached drawings.

Material of Article

The member to which the present invention pertains is an optically transparent member and is formed of, for example, glass, quartz, or a resin exhibiting transparency (acrylic, polycarbonate, etc.) as the raw material.

Surface Profile

At the reflecting surface of the above-described member, minute hubbly surface profile including indentations and protrusions are formed, this reflecting surface is divided into minute compartments each having a prescribed size (in this embodiment, compartments with 0.2913 μm on each side), and a hubbly profile is formed in the reflecting surface so that, when a histogram is constructed based on measurement values obtained by measuring the height in each compartment (the height with reference to a zero point defined as the minimum height value $H_{min}$, which is the deepest part of the valleys in the surface with the indentations and protrusions), the probability density of the mode in this histogram is 10 to 30%, and the variance $\sigma^2$ of the histogram, calculated on the basis of the heights, is less than 0.4 (μm²).

Measurement of Hubbly Surface Profile

In the light-transmitting member subjected to antiglare treatment like that described above, a possible cause of the blurred outline of the transmission image is that the transmission image (transmitted light) is diffusely reflected by the hubbly surface profile.

Figure 1:
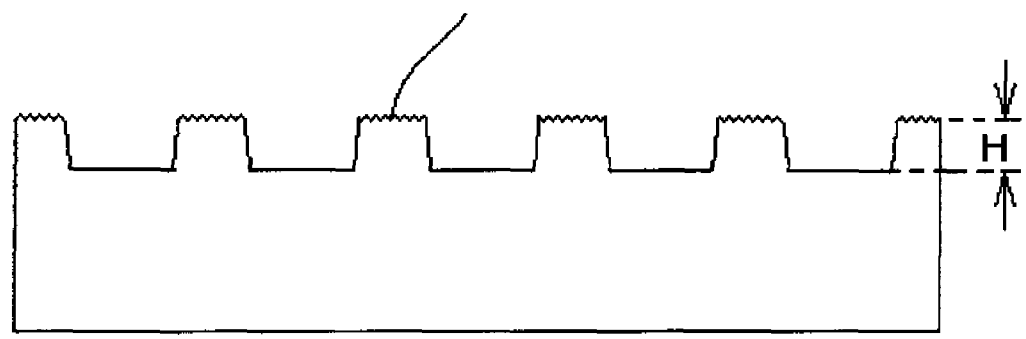
FIG. 1 is a cross-sectional view schematically illustrating the surface profile of a light-transmitting member of the present invention.
Figure 2:
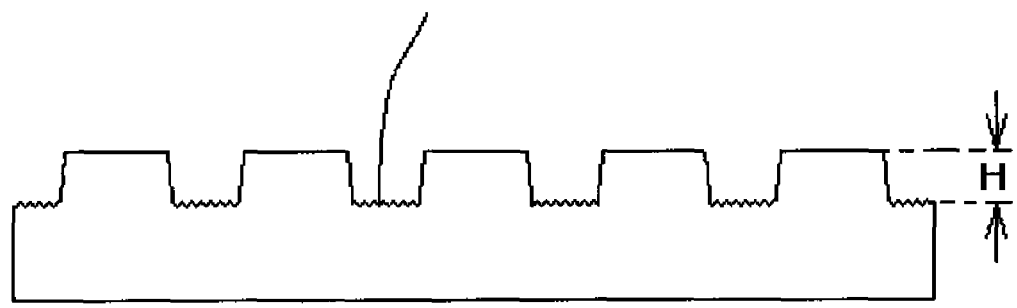
FIG. 2 is a cross-sectional view schematically illustrating the surface profile of a light-transmitting member of the present invention.

Thus, in the case where flat portions are formed at the peaks, as schematically shown by the cross-sectional shape in FIG. 1, in the case where flat portions are formed between peaks (in the valleys), as shown in FIG. 2, in the case where a mixture of these is used, and so forth, which are examples of the hubbly surface profile of the reflecting surface, the inventors of the present invention speculated that it might be possible to confer the light-transmitting member with antiglare properties while at the same time conferring the conflicting property of maintaining the sharpness of the transmission image if the flat portions could be provided at a fixed ratio, so that diffuse reflection of the transmission image (transmitted light) could be inhibited at this flat portion, making it possible, as a result, to maintain a sharp outline to a certain extent in the transmission image.

Furthermore, the inventors speculated that, to reduce the reflectance at the reflecting surface, it is not necessary to provide a large height difference in the hubbly surface profile such as indentations and protrusions that are formed so long as it is possible to bring about diffuse reflection at the reflecting surface, whereas if indentations and protrusions with a height difference larger than the required size were formed, such a large height difference would, on the contrary, reduce the image quality of the transmission image.

In consideration of the predictions described above, with regard to the extent to which such flat portions are formed and how the height is distributed in the reflecting surface, the following measurements were performed to confirm whether a sharp transmission image could be realized and to numerically define such a shape.

Measurement Method

Assuming that flat portions like those shown in FIG. 1 are formed in the reflecting surface of the light-transmitting member, if the reflecting surface is divided into small compartments and the height in each compartment (the height with reference to a zero point defined as the minimum height value $H_{min}$ (deepest part of the valleys) in the surface with the indentations and protrusions) is measured, the heights of the compartments located at the flat portions should be measured as having substantially the same height.

Therefore, when a histogram is constructed on the basis of this measurement data, if the flat potions are formed in the reflecting surface at a prescribed ratio, a height corresponding to the height of the flat portions appears as the mode, and the probability density of this mode can be taken as corresponding to the ratio of the area of the flat portions with respect to the area of the entire reflecting surface.

Under the above assumptions, the reflecting surface is partitioned into minute compartments (rectangular points with 0.2913 μm square), the height of each compartment is measured, and the probability density of the mode is obtained.

Figure 3:
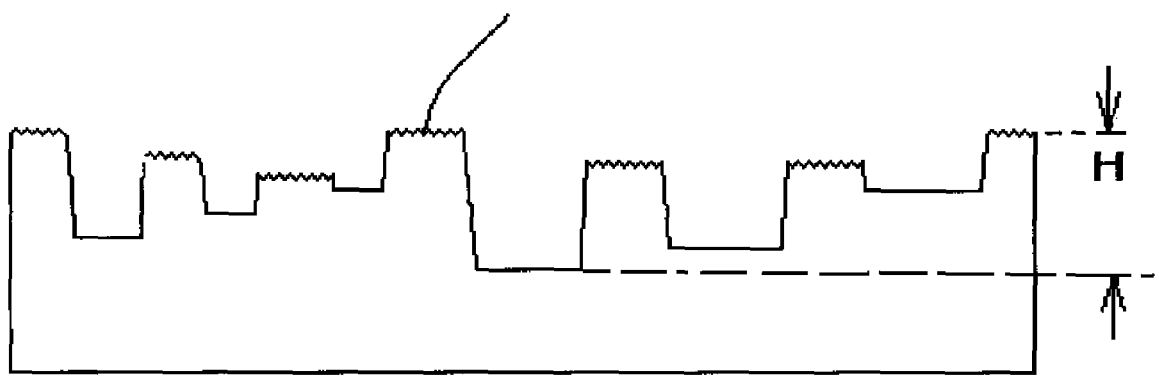
FIG. 3 is a cross-sectional view schematically illustrating the surface profile of a light-transmitting member of the present invention.
Figure 4:
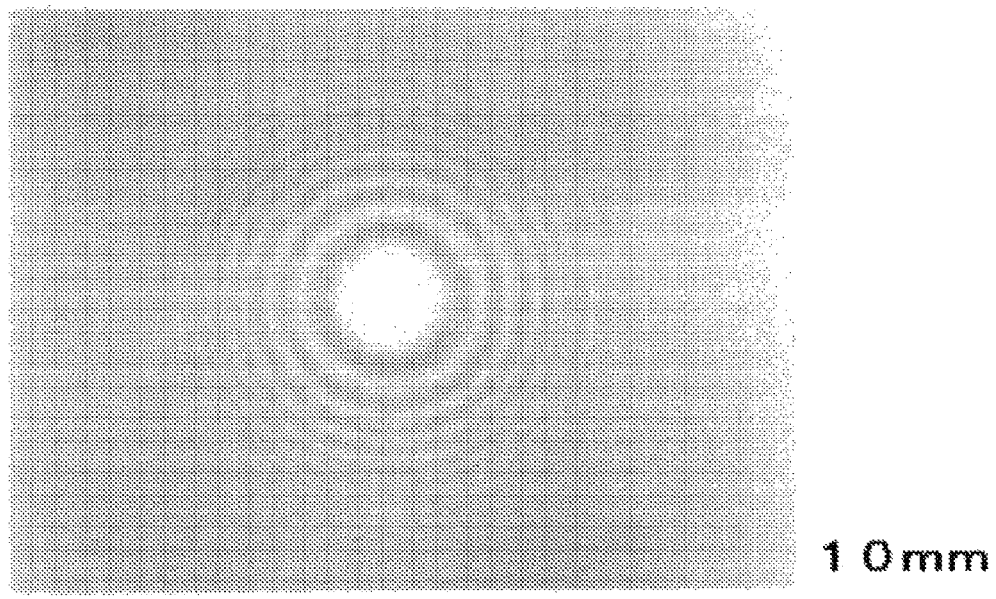
FIG. 4 is a view showing an image acquired by imaging a circular zone plate that has passed through a test piece of Example 1.
Figure 5:
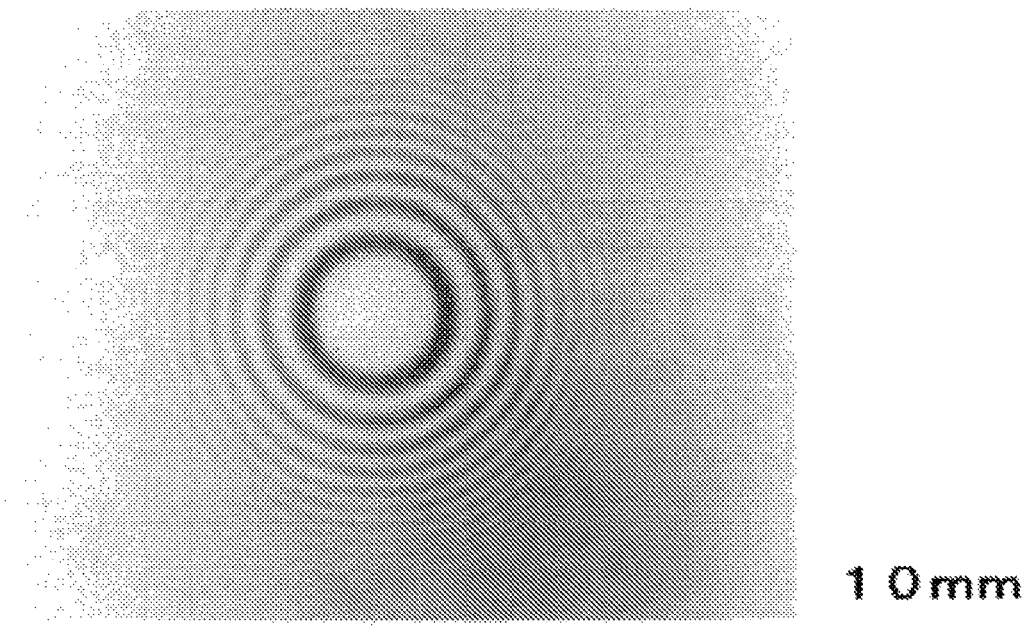
FIG. 5 is a view showing an image acquired by imaging a circular zone plate that has passed through a test piece of Example 2.
Figure 6:
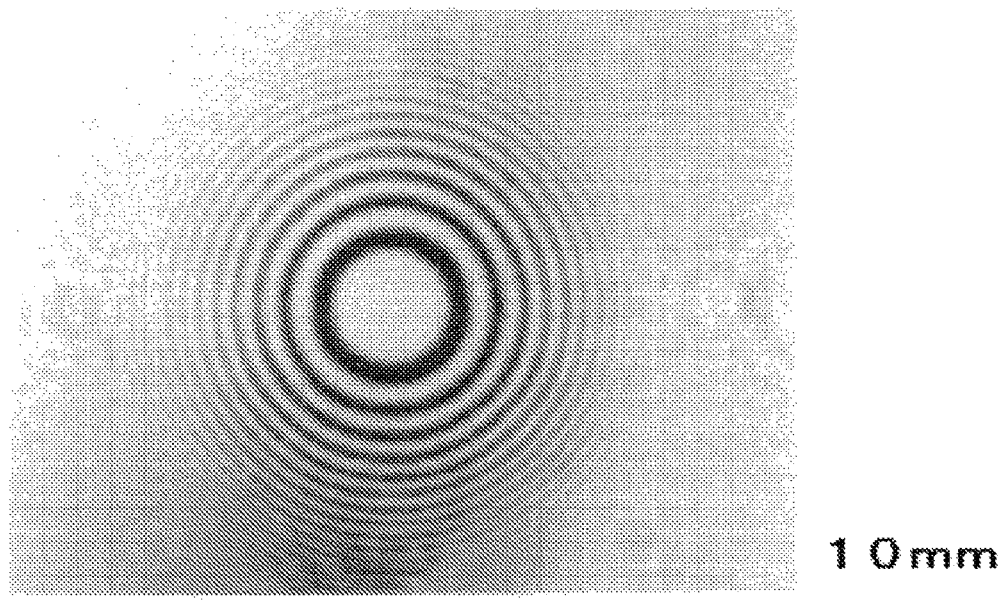
FIG. 6 is a view showing an image acquired by imaging a circular zone plate that has passed through a test piece of Example 3.
Figure 7:
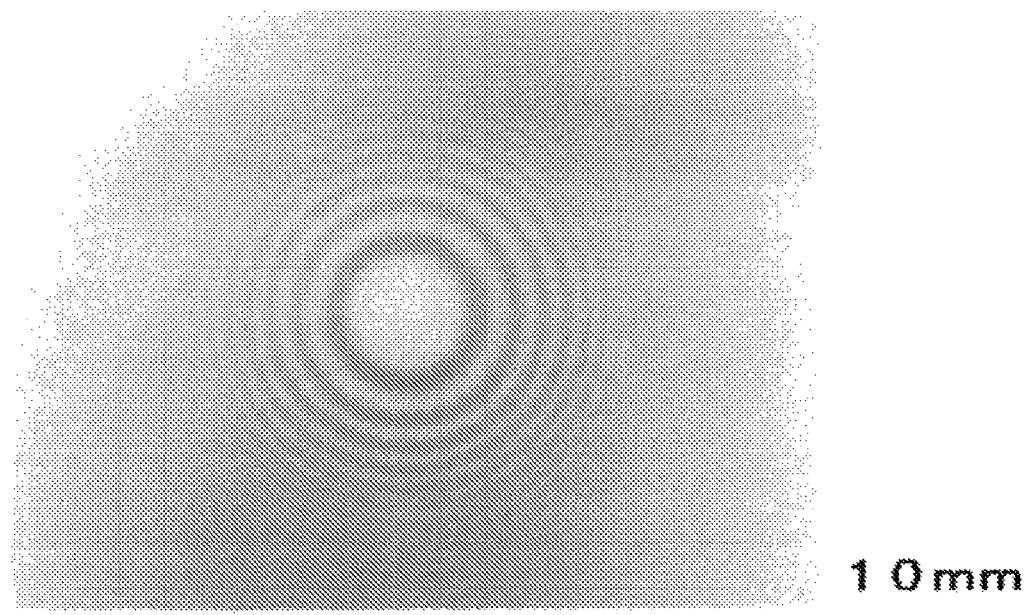
FIG. 7 is a view showing an image acquired by imaging a circular zone plate that has passed through a test piece of Example 4.
Figure 8:
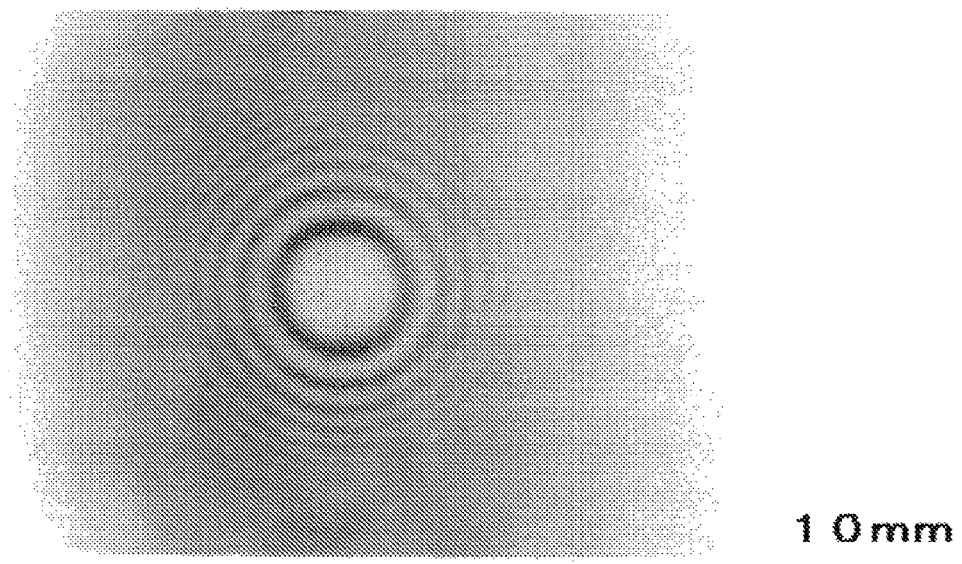
FIG. 8 is a view showing an image acquired by imaging a circular zone plate that has passed through a test piece of Example 5.
Figure 9:
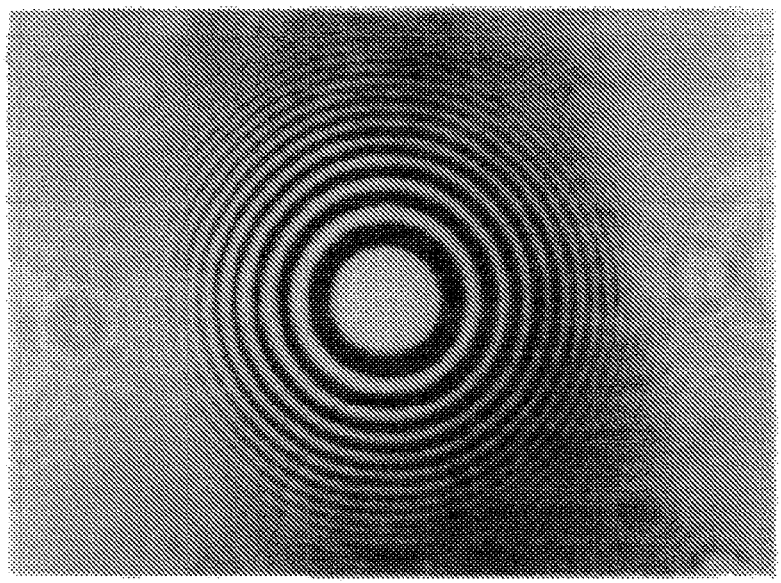
FIG. 9 is a view showing an image acquired by imaging a circular zone plate that has passed through a test piece of Example 6.
Figure 10:
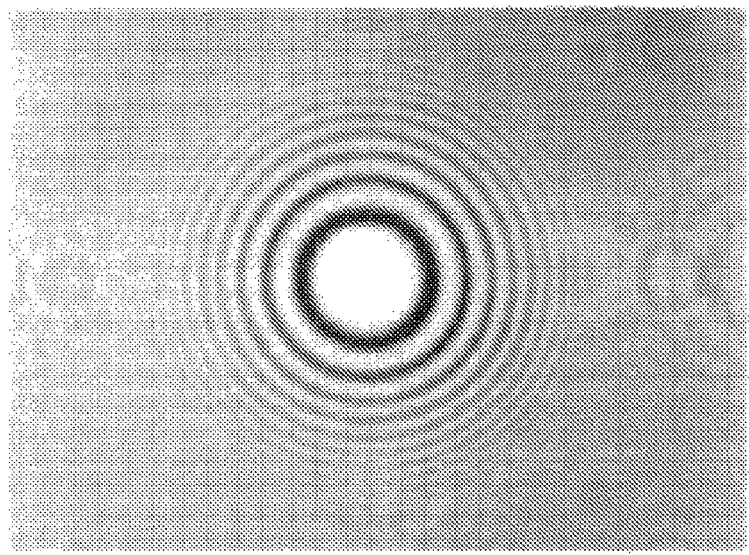
FIG. 10 is a view showing an image acquired by imaging a circular zone plate that has passed through a test piece of Example 7.
Figure 11:
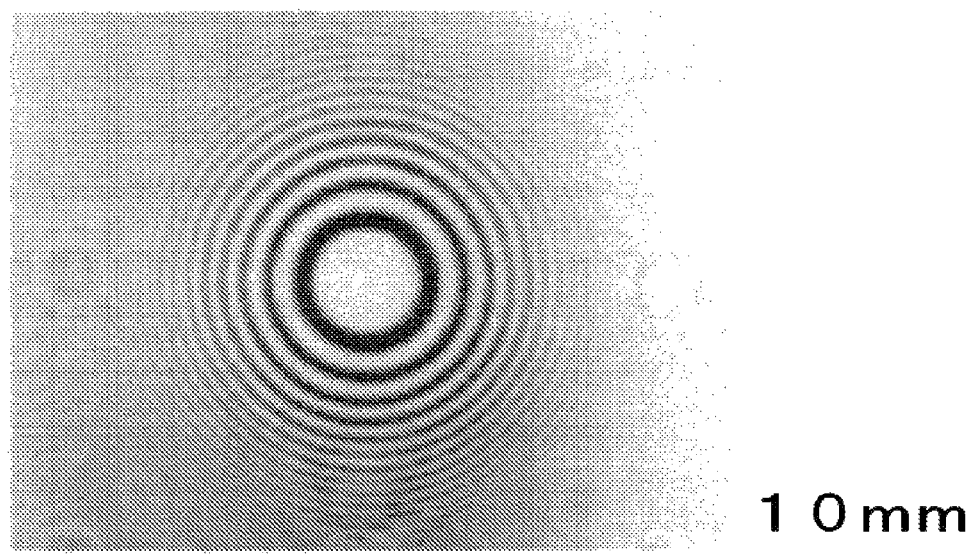
FIG. 11 is a view showing an image acquired by imaging a circular zone plate that has passed through a test piece of Example 8.
Figure 12:
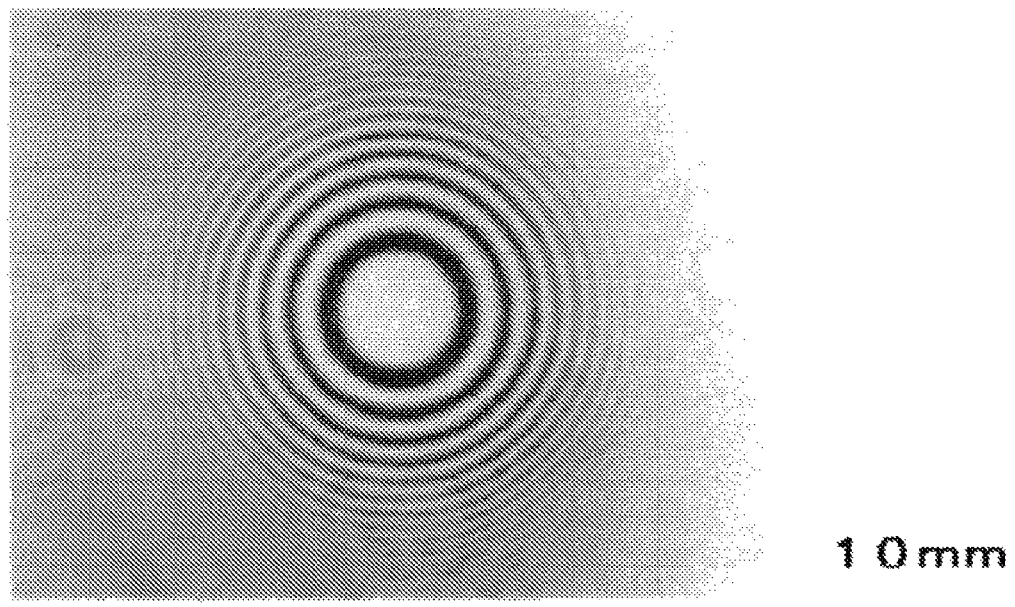
FIG. 12 is a view showing an image acquired by imaging a circular zone plate that has passed through a test piece of Example 9.
Figure 13:
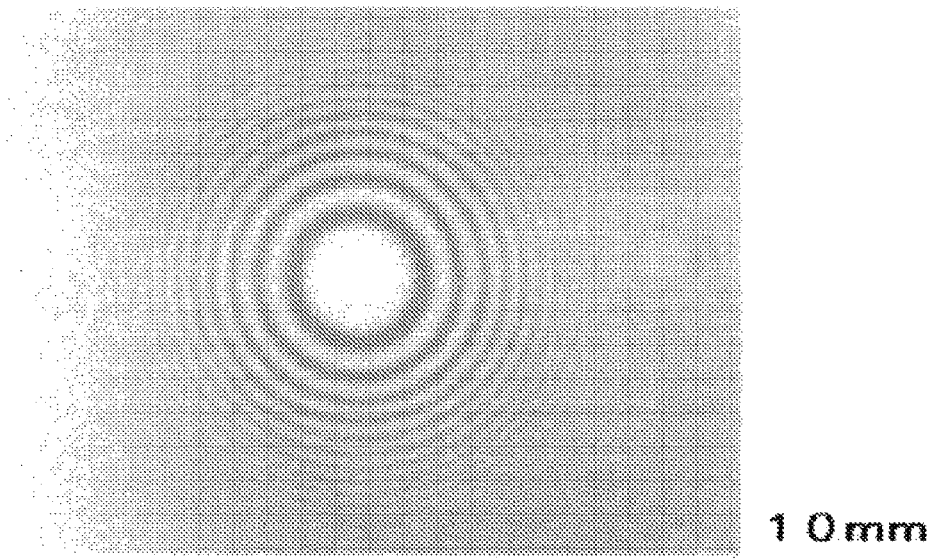
FIG. 13 is a view showing an image acquired by imaging a circular zone plate that has passed through a test piece of Example 10.
Figure 14:
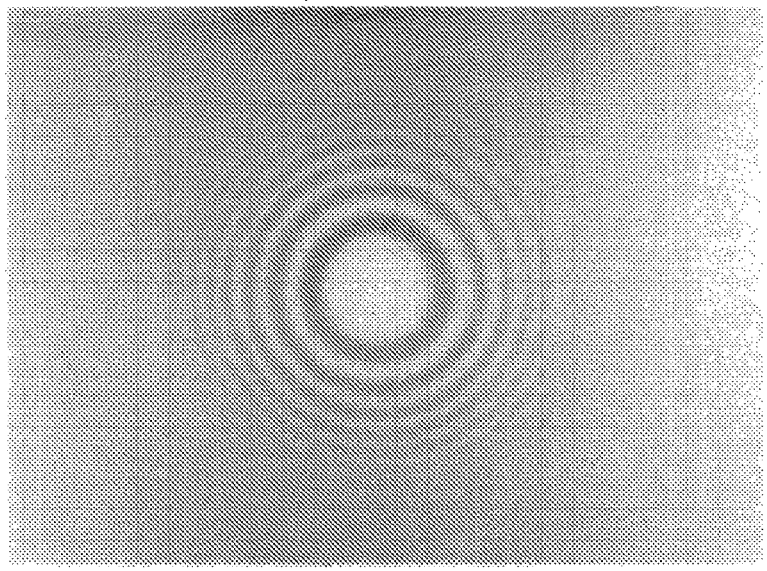
FIG. 14 is a view showing an image acquired by imaging a circular zone plate that has passed through a test piece of Example 11.
Figure 15:
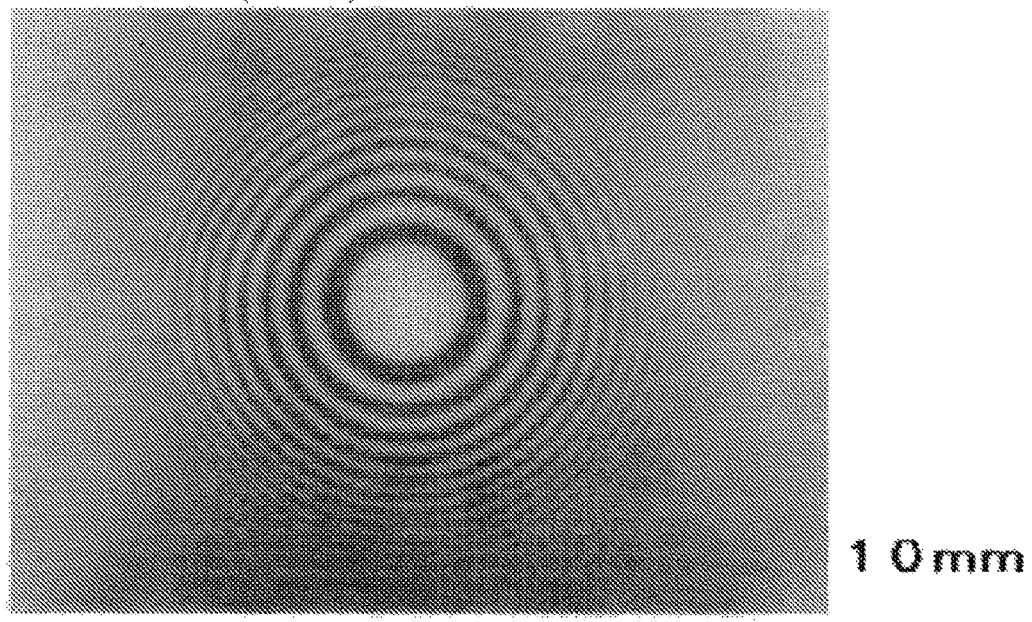
FIG. 15 is a view showing an image acquired by imaging a circular zone plate that has passed through a test piece of Example 12.
Figure 16:
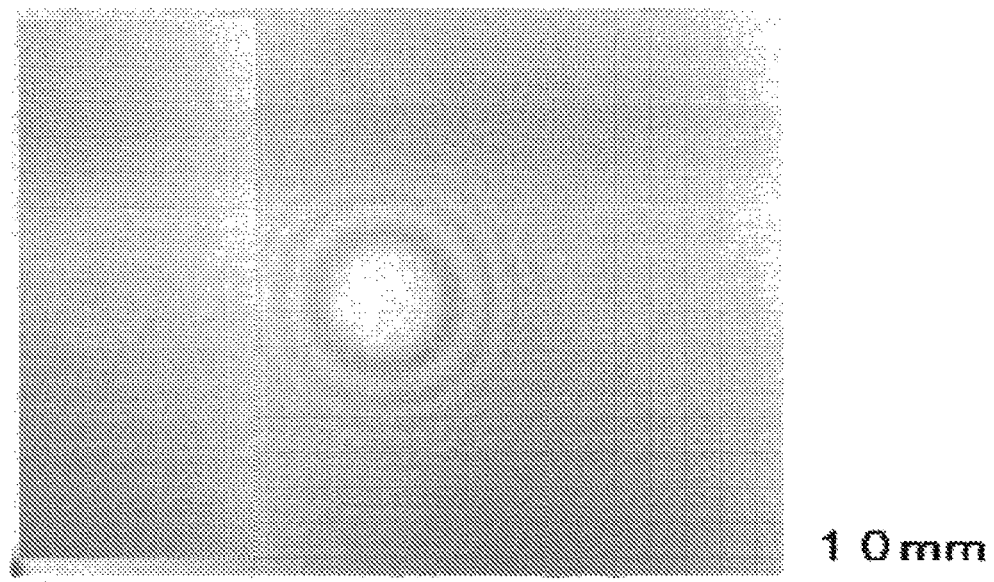
FIG. 16 is a view showing an image acquired by imaging a circular zone plate that has passed through a test piece of Comparative Example 1.
Figure 17:
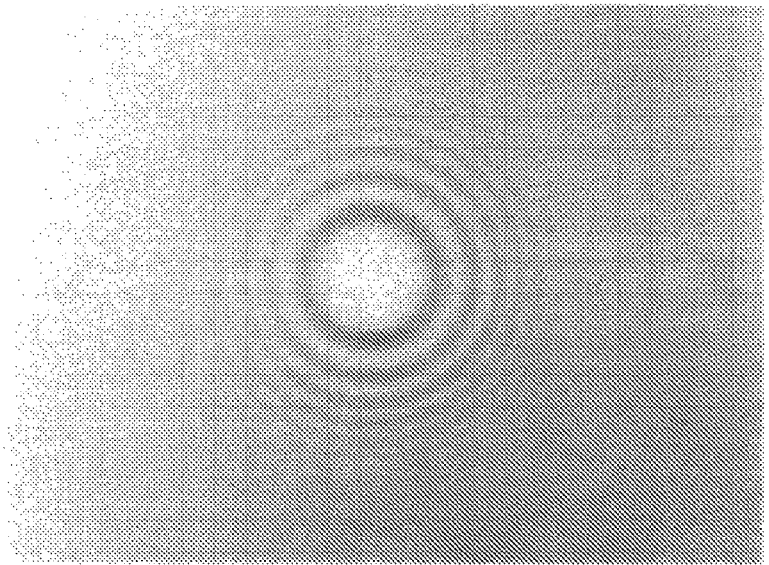
FIG. 17 is a view showing an image acquired by imaging a circular zone plate that has passed through a test piece of Comparative Example 2.
Figure 18:
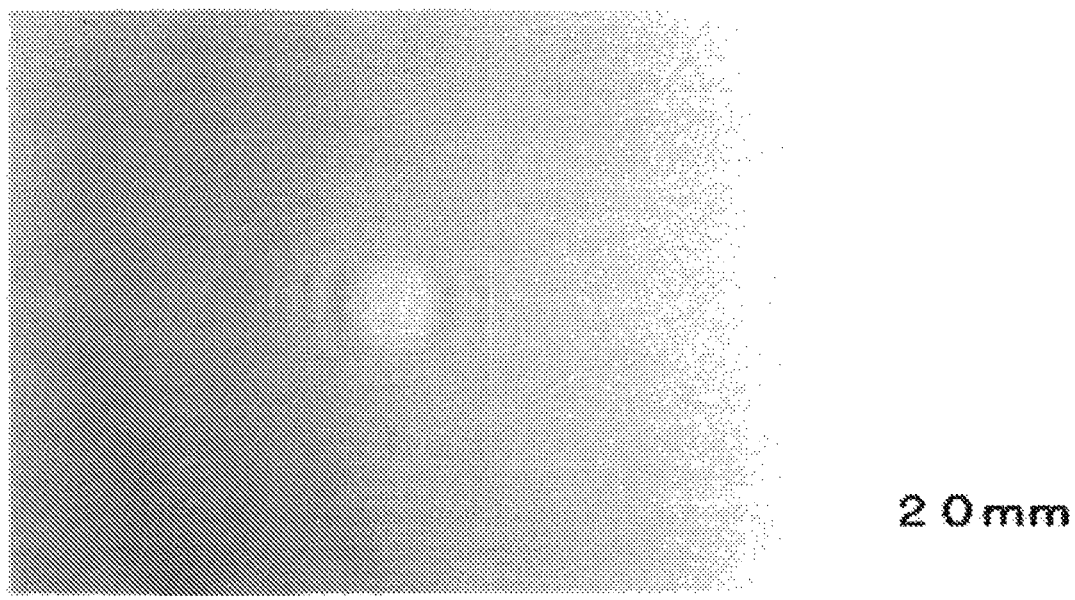
FIG. 18 is a view showing an image acquired by imaging a circular zone plate that has passed through a test piece of Comparative Example 3.
Figure 19:
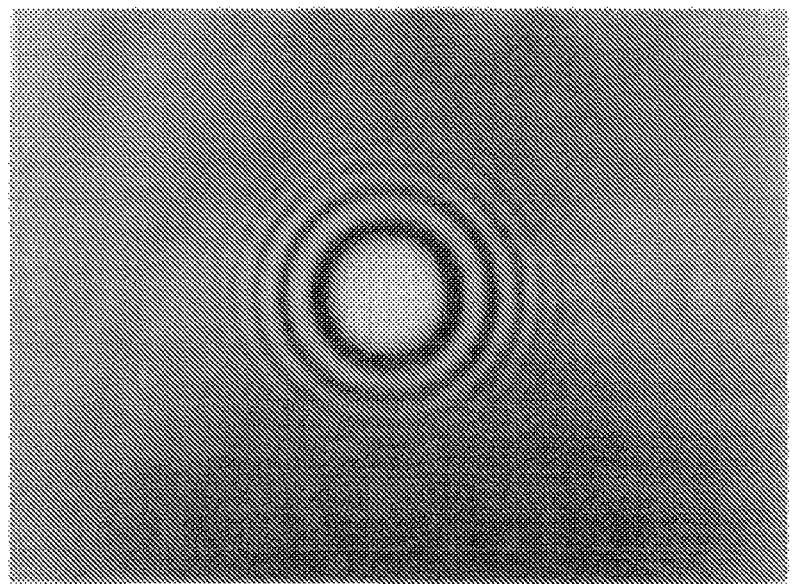
FIG. 19 is a view showing an image acquired by imaging a circular zone plate that has passed through a test piece of Comparative Example 4.
Figure 20:
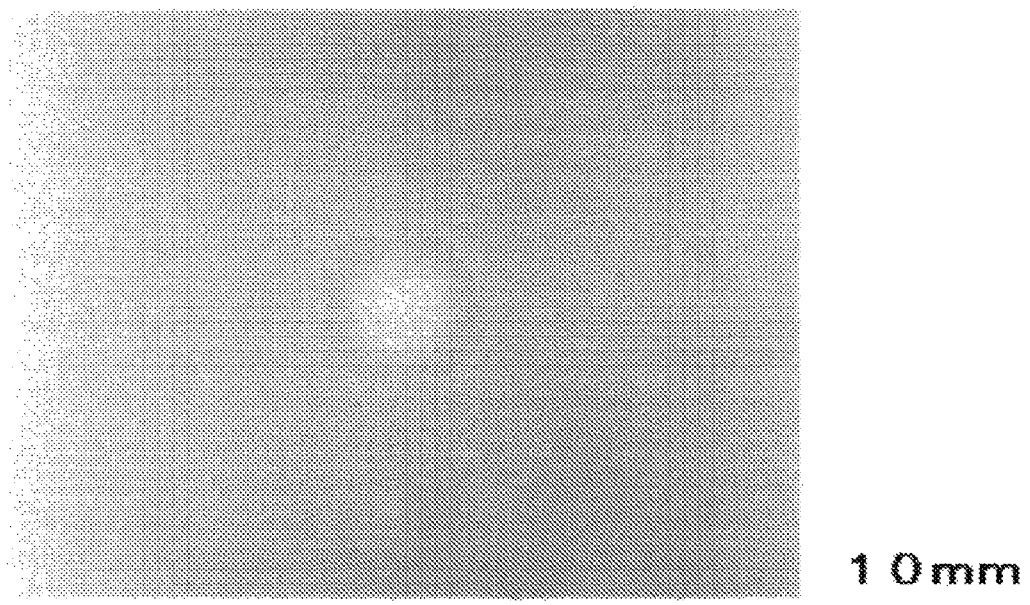
FIG. 20 is a view showing an image acquired by imaging a circular zone plate that has passed through a test piece of Comparative Example 5.
Figure 21:
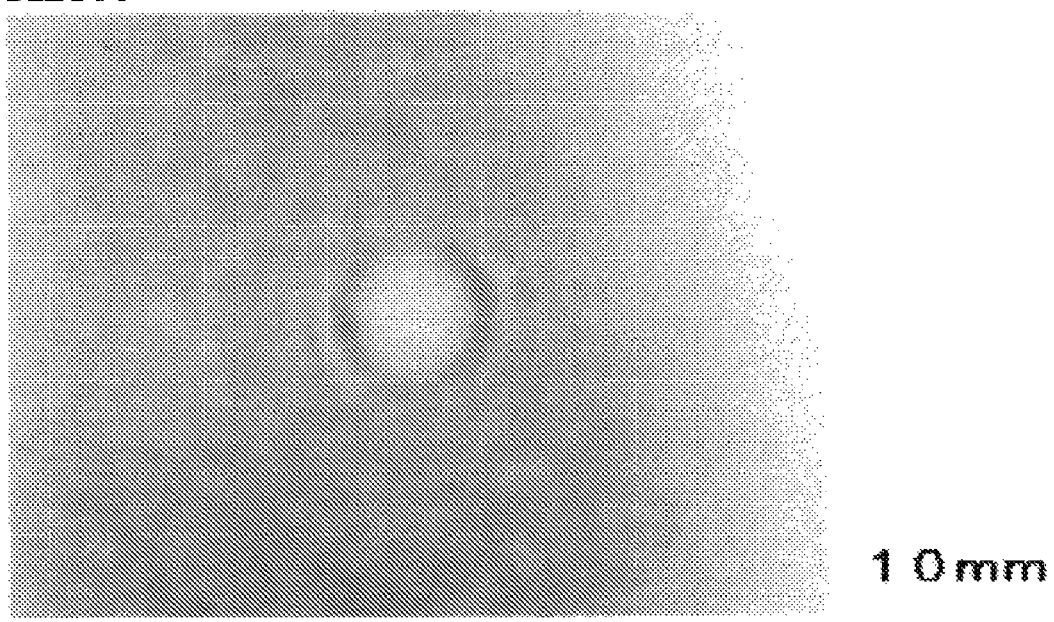
FIG. 21 is a view showing an image acquired by imaging a circular zone plate that has passed through a test piece of Comparative Example 6.
Figure 22:
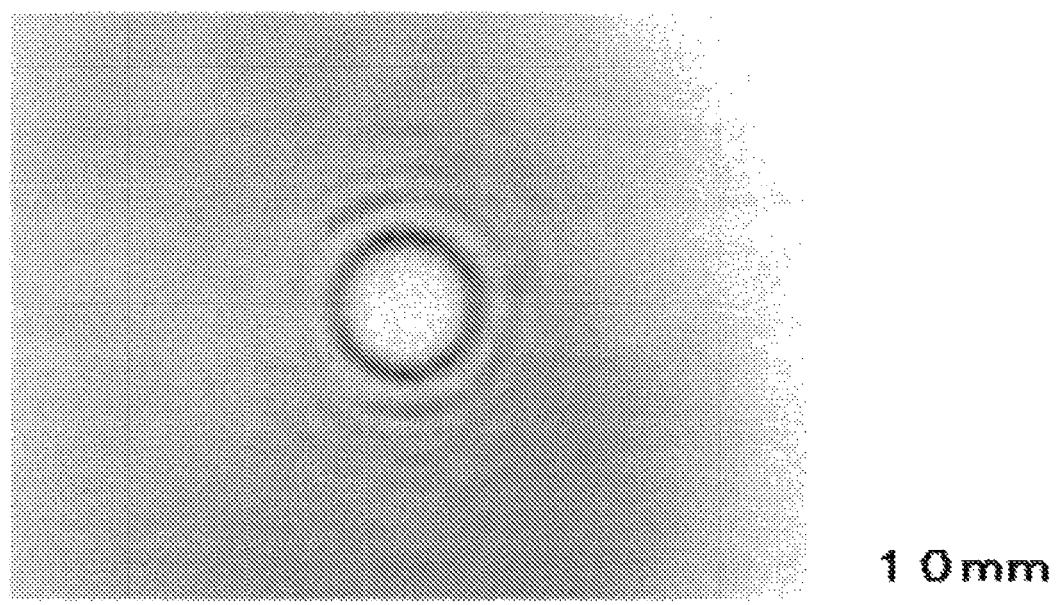
FIG. 22 is a view showing an image acquired by imaging a circular zone plate that has passed through a test piece of Comparative Example 7.
Figure 23:
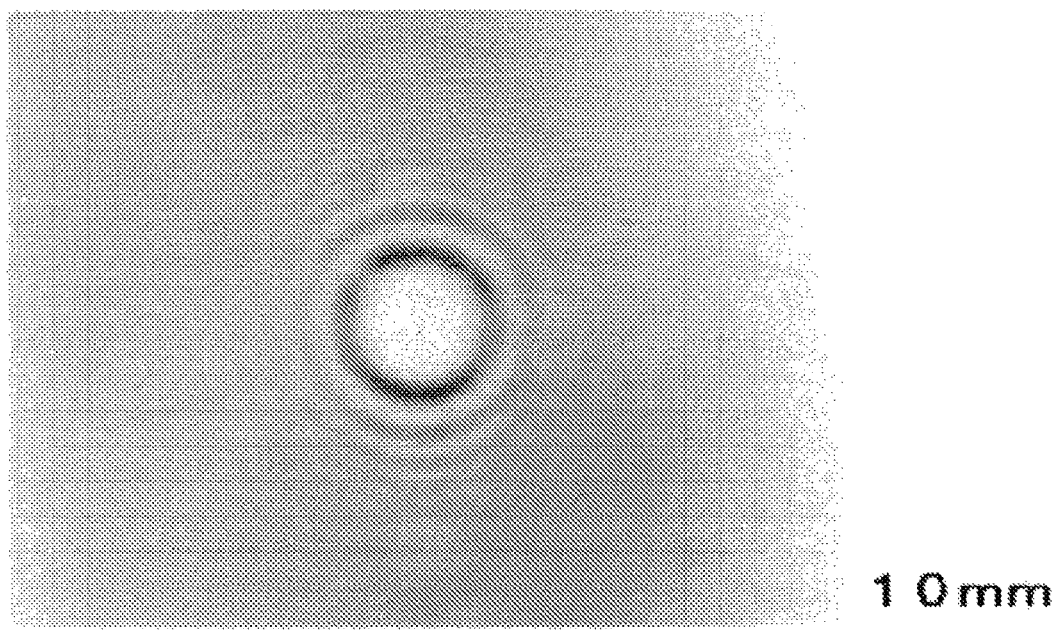
FIG. 23 is a view showing an image acquired by imaging a circular zone plate that has passed through a test piece of Comparative Example 8.
Figure 24:
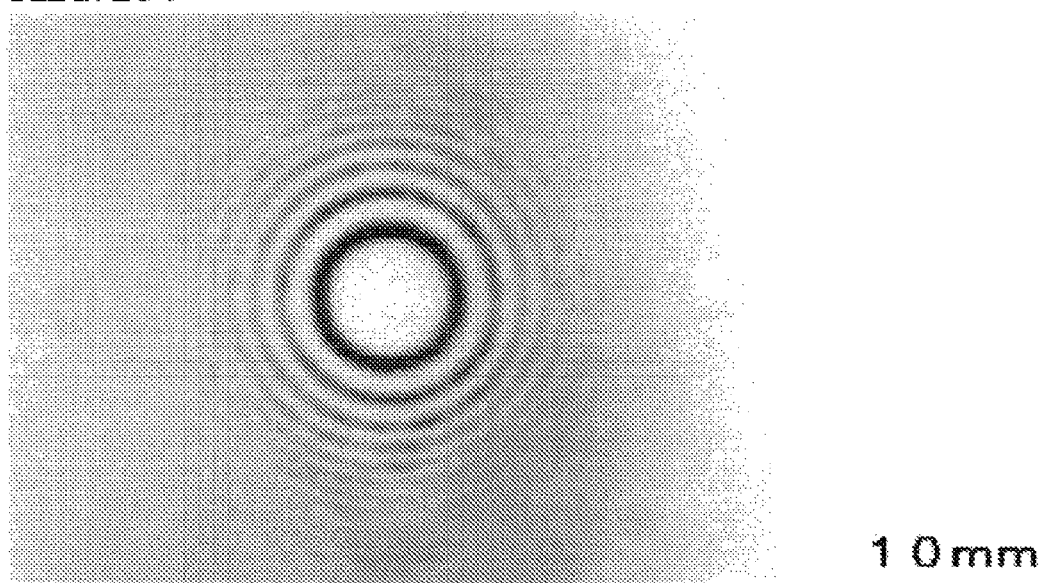
FIG. 24 is a view showing an image acquired by imaging a circular zone plate that has passed through a test piece of Comparative Example 9.
Figure 25:
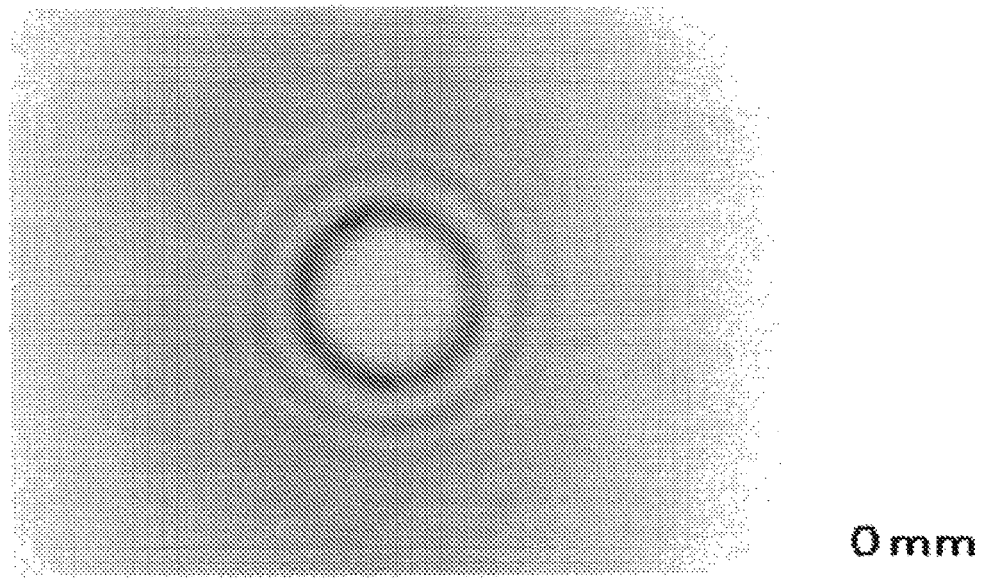
FIG. 25 is a view showing an image acquired by imaging a circular zone plate that has passed through a test piece of Comparative Example 10.
Figure 26:
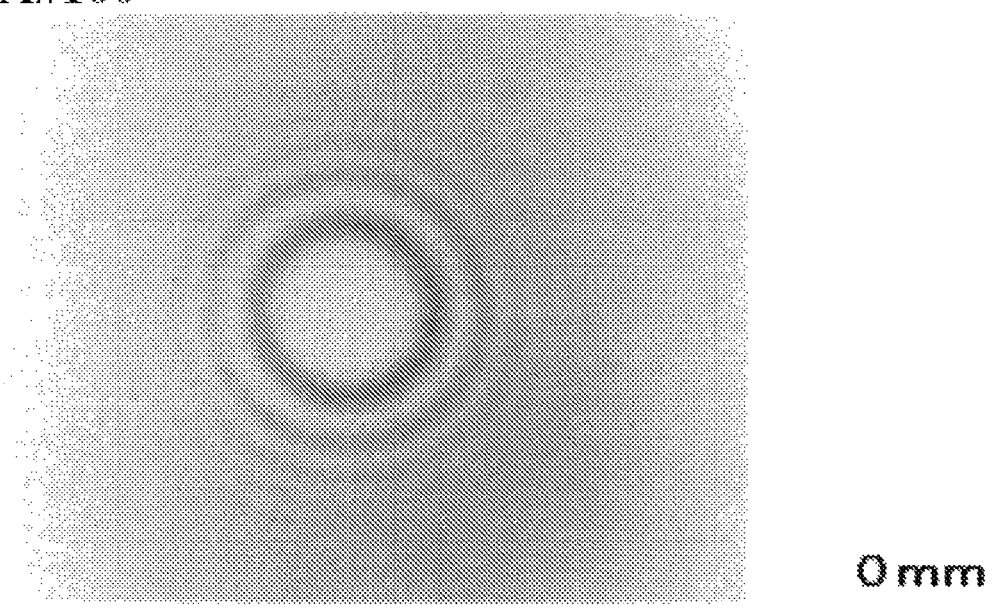
FIG. 26 is a view showing an image acquired by imaging a circular zone plate that has passed through a test piece of Comparative Example 11.
Figure 27:
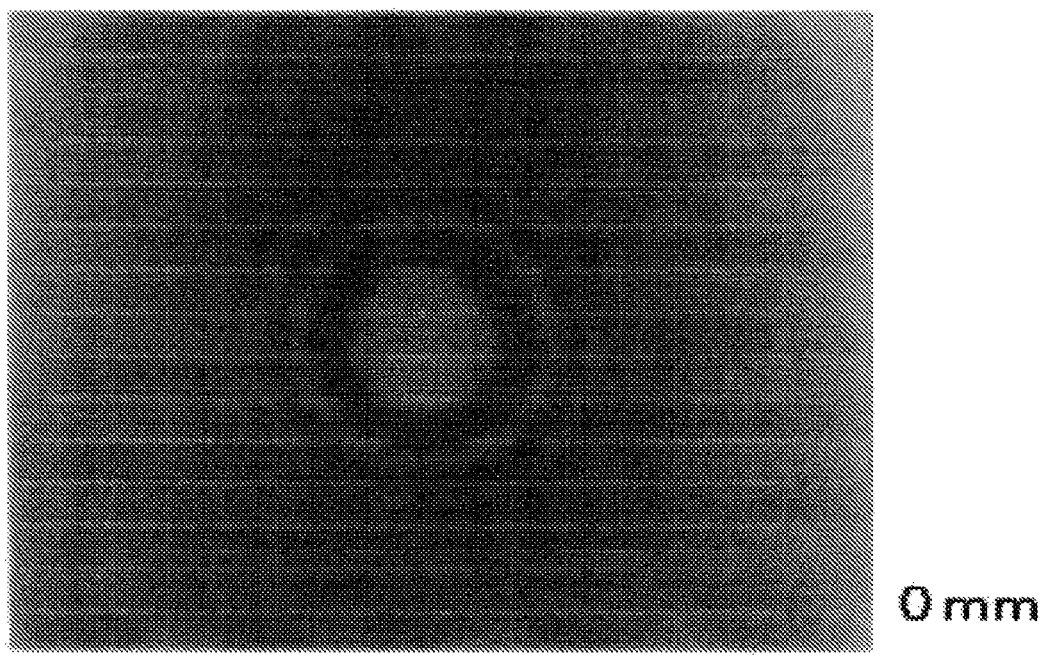
FIG. 27 is a view showing an image acquired by imaging a circular zone plate that has passed through a test piece of Comparative Example 12.
Figure 28:
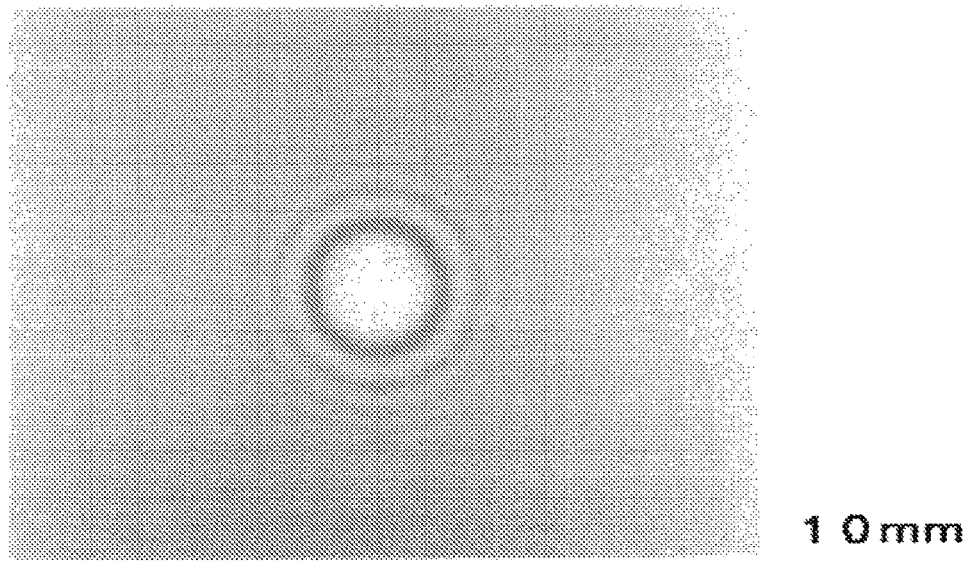
FIG. 28 is a view showing an image acquired by imaging a circular zone plate that has passed through a test piece of Comparative Example 13.
Figure 29A:
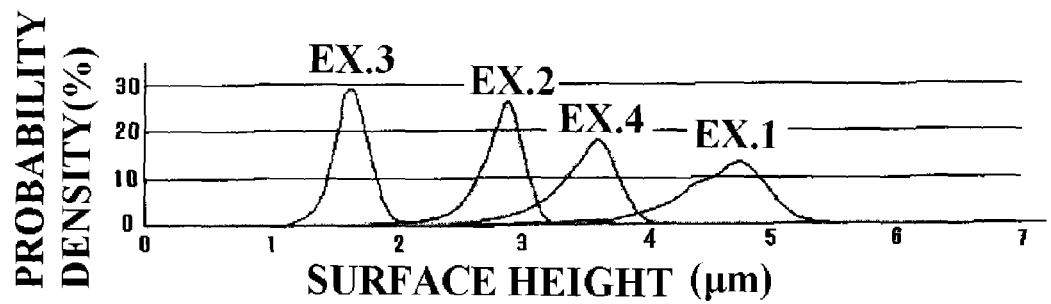
FIG. 29A is histograms showing the height distributions of test pieces of Examples 1 to 4.
Figure 29B:
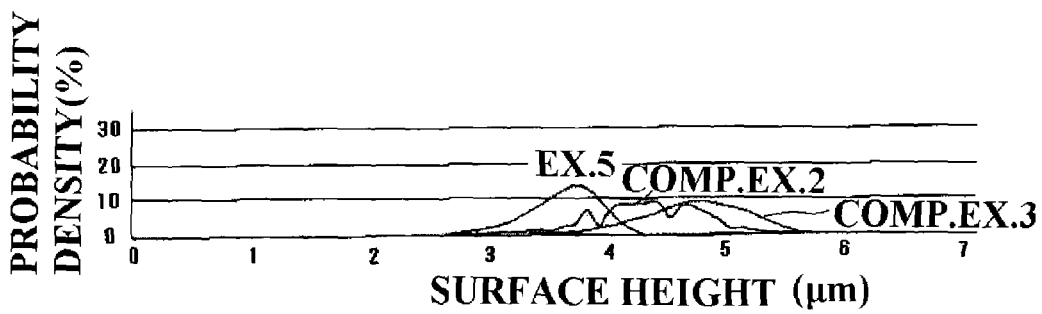
FIG. 29B is histograms showing the height distributions of test pieces of Examples 5 and Comparative Examples 2 and 3.
Figure 29C:
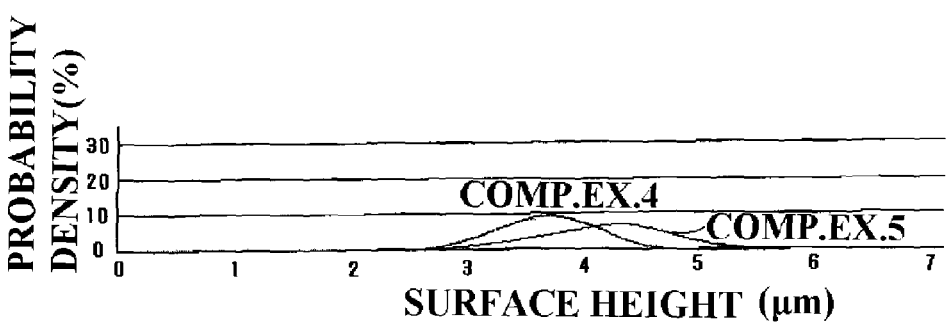
FIG. 29C is histograms showing the height distributions of test pieces of Comparative Examples 4 and 5.
Figure 30A:
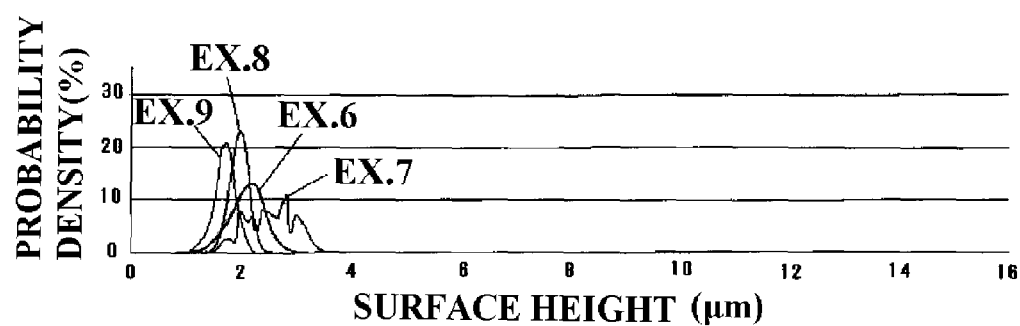
FIG. 30A is histograms showing the height distributions of test pieces of Examples 6 to 9.
Figure 30B:
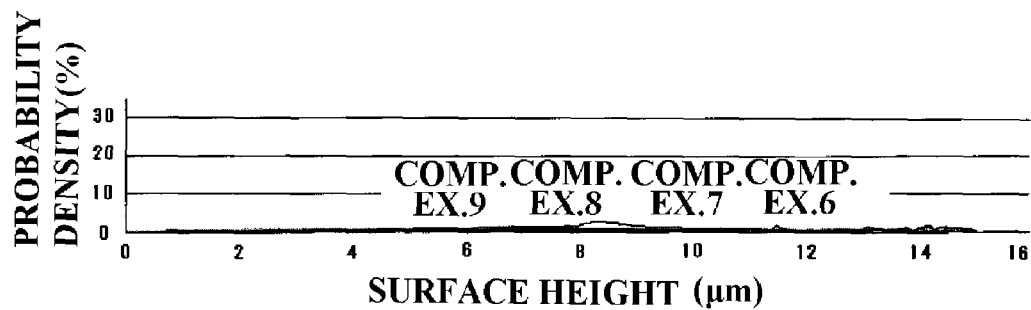
FIG. 30B is histograms showing the height distributions of test pieces of Comparative Examples 6 to 9.
Figure 31A:
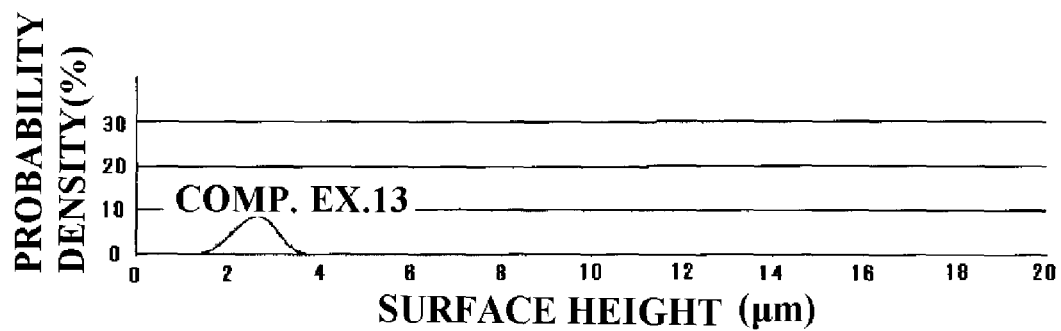
FIG. 31A is a histogram showing the height distribution of a test piece of Comparative Example 13
Figure 31B:
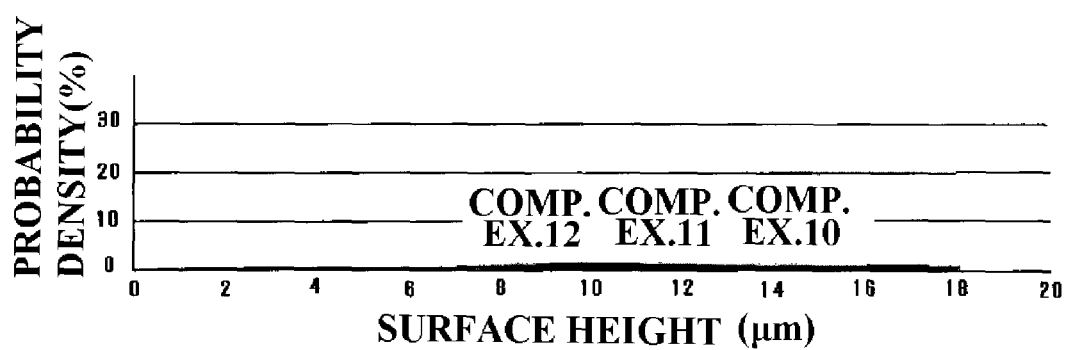
FIG. 31B is histograms showing the height distributions of test pieces of Comparative Examples 10 to 12.
Figure 32A:
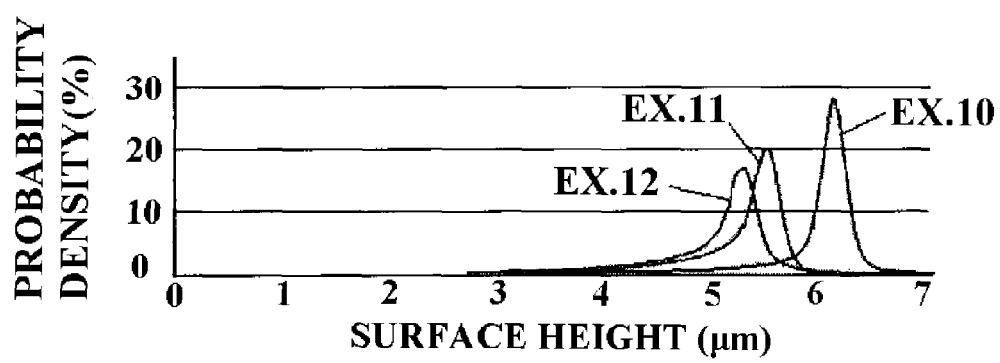
FIG. 32A is histograms showing the height distributions of test pieces of Examples 10 to 12.
Figure 32B:
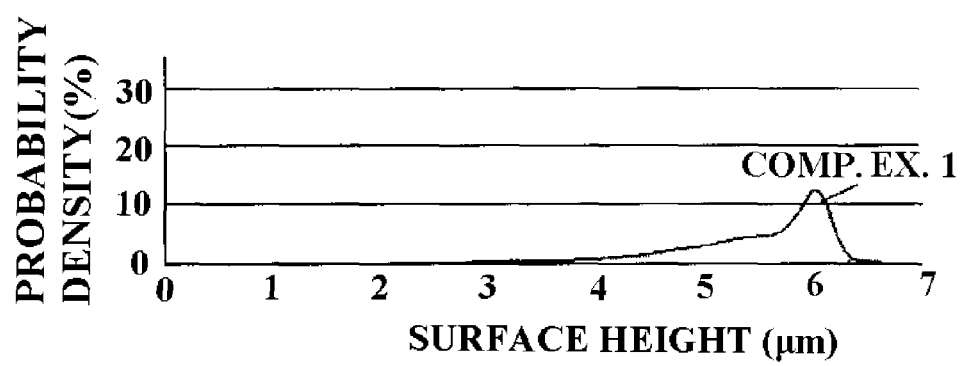
FIG. 32B is a histogram showing the height distribution of a test piece of Comparative Example 1.

However, in the measurement method described above, the heights of the minute compartments (rectangular points with 0.2913 μm square) are measured to obtain the probability density of the mode, and it is not determined whether minute compartments with the same height exist continuously or contiguously. As a result, the width of the "flat portion" shown in FIGS. 1 to 3 can be taken as the width of the above compartments in the case where they are minimums.

From the predictions described above, for a light-transmitting member in which good visibility of the transmission image is maintained, the data in the histogram are distributed around the mode with some degree of convergence thereto, and such a surface profile can be numerically represented by the variance ($\sigma^2$).

Measurement Method (Mode Probability Density and Variance)

Under the above-described assumptions, defining one compartment as an area of one pixel in an image acquired by imaging a processed test piece at 1000-times magnification (test piece surface with 0.2913 μm square (actual dimensions)) under various conditions, the image is divided into 1,024 columns by 768 rows, giving a total of 786,432 compartments, and the height in each compartment is measured to construct a histogram.

The measured height of each compartment is given in measurement units of [μm] and is measured to two decimal places.

A histogram is constructed with the x-axis showing height categories in intervals of 0.1 μm and the y-axis showing the probability density obtained by dividing the incidence of samples falling in each category by the total number of data, and the probability density of the mode in this histogram is obtained.

The variance $\sigma^2$ (μm²) is given by the following equation on the basis of the height X (μm) of each compartment.

EQUATION $m$: mean height (μm)

$\sigma^2$: variance (m²)

$X$: height (μm)

$$m = \frac{1}{786,432} \sum_{i=1}^{786,432} Xi$$

$$\sigma^2 = \frac{1}{786,432} \sum_{i=1}^{786,432} (xi - m)^2$$

Measurement Results and Transparency

The test pieces showing mode probability densities in the range 10 to 30% and a variance ($\sigma^2$) of less than 0.4 (μm²), obtained in the manner described above, were identified as those having the preferred transparency, where the outline of the image could be clearly confirmed even after the reflectance was reduced by the hubbly surface profiles.

In contrast, a test piece falling outside the above-described numerical ranges for the mode probability density and/or variance ($\sigma^2$) has an insufficient decrease in reflectance, considerably lower visibility of the transmission image due to the blurred outline of the transmission image, and so on, and therefore cannot satisfy the conflicting properties of reducing reflectance while maintaining transparency.

Other Conditions Related to Surface Profile
Surface Roughness of Reflecting Surface The surface roughness of the entire reflecting surface falling within the above-described numerical ranges obtained from the histogram, in terms of Ra, is 0.5 μm or less, preferably 0.3 μm or less, and more preferably 0.23 μm or less, and in terms of Rz, is 3 μm or less, preferably 2 μm or less, and more preferably 1.6 μm or less. With increasing roughness (increasing height difference in the indentations and protrusions) of the hubbly surface profile of the reflecting surface, the sharpness of the transmission image is lost, and these results are consistent with a loss of sharpness of the transmission image with increasing variance ($\sigma^2$), described above.

Surface Formation

When the above-described light-transmitting member is a transparent plate, the reflecting surface (hubbly surface profile) may be formed on only one surface of the transparent plate, or it may be formed on both the front and rear faces.

When the hubbly surface profile is formed on only one surface, the flat portion in the habbly profile such as indentations and protrusions formed on the reflecting surface as described above are parallel to the other surface of the transparent plate; as a result, it is possible to make the outline of the transmission image passing through these portions more sharp.

Optical Characteristics

The light-transmitting member having the reflecting surface formed in the manner described above was confirmed to exhibit the following optical characteristics: a parallel transmittance of 20% or more, a haze value of 20 to 70%, and a reflectance of 7% or less at all wavelengths. As compared with, for example, a glass plate before indentations and protrusions are formed therein (for example, having a parallel transmittance of 91%, a haze value of 0%, and a reflectance (for 30 degree oblique light) of 7.5%), it was also confirmed that a higher haze value and considerably reduced visible-light reflectance were achieved, while maintaining the parallel transmittance to some extent.

In an experiment to confirm the visibility by using a circular zone plate, the light-transmitting members having such optical characteristics have, in all cases, a visibility that enables 7 or more complete dark rings to be distinguished.

As the apparatus for measuring the optical characteristics such as parallel transmittance, haze value mentioned above is a haze meter (NDH 5000W, Nippon Denshoku Industries Co., Ltd.) was used, and as the apparatus for measuring the reflectance (30 degree oblique light) is a spectrophotometer (U4100, Hitachi High Technologies Co. Ltd.).

Method of Forming Above-Described Surface Profile

The hubbly surface profile described above may be formed by any method; as one example, however, it can be formed by blasting the surface with an abrasive using a known blasting device.

To form the hubbly surface profile in the reflecting surface of the light-transmitting member, the indentations and protrusions may be formed by performing the above-described blasting process etc. directly on the surface of the optically transparent member. Alternatively, the hubbly surface profile may be formed in the surface of, for example, a metal plate or glass plate by the blasting etc. described above, and using the metal plate or glass plate etc. with these indentations and protrusions formed therein as a mold or steel stamp, a transparent resin may be poured onto this mold to form a light-transmitting member to which these hubbly surface profile is transferred. In this case, if the hubbly surface profile formed in the mold has flat portions at the peaks as shown in the example in FIG. 1, the light-transmitting member obtained by using this mold has the inverse profile where the flat portions are formed between the peaks (in the valleys), as shown in FIG. 2. The same advantages can also be achieved with this pattern.

Next, actually fabricated light-transmitting members of the present invention and the results of characterization experiments conducted on the thus-obtained light-transmitting members will be described in the following.

Actually Fabricated Examples

One surface of a glass plate with a thickness of 1.8 mm, a length of 90 mm, and a width of 90 mm (parallel transmittance 91%, haze value 0%, reflectance of 7.5% with 30-degree oblique light) was subjected to blasting processing under the processing conditions described in Table 1 below, to form the hubbly surface profile including indentations and protrusions therein.

In Table 1 below, "Process 2" indicates that processing was performed with the conditions mentioned under "Process 2" after performing processing with the conditions mentioned under "Process 1".

TABLE 1

| | | Process 1 | | | | | |
|---|---|---|---|---|---|---|---|
| | No. | Abrasive (WA) | Nozzle | Blasting level (Hz) | Pressure (MPa) | Distance (mm) | Processing speed (mm/s) | Process 2 |
| Examples | 1 | 1000 | 10 × 2 | 90 | 0.3 | 20 | 500.0 | |
| | 2 | 1000 | 10 × 2 | 90 | 0.15 | 20 | 1000.0 | |

TABLE 1-continued

| | No. | Abrasive (WA) | Nozzle | Blasting level (Hz) | Pressure (MPa) | Distance (mm) | Processing speed (mm/s) | Process 2 |
|---|---|---|---|---|---|---|---|---|
| | 3 | 2000 | 10 × 2 | 60 | 0.2 | 60 | 700.0 | |
| | 4 | 1000 | 10 × 2 | 90 | 0.3 | 20 | 500.0 | |
| | 5 | 1000 | 10 × 2 | 90 | 0.3 | 20 | 167.0 | |
| | 6 | 1200 | F2-4 | | | | 100% cvg | Example 1 |
| | 7 | 1500 | F2-4 | | | | 100% cvg | Example 1 |
| | 8 | 2000 | F2-4 | | | | 100% cvg | Example 1 |
| | 9 | 3000 | F2-4 | | | | 100% cvg | Example 1 |
| | 10 | 1000 | F2-4 | | | | 60% cvg | |
| | 11 | 1000 | F2-4 | | | | 60% cvg | |
| | 12 | 1000 | F2-4 | | | | 80% cvg | |
| Comparative | 1 | 1000 | F2-4 | | | | 80% cvg | |
| Examples | 2 | 1000 | 10 × 2 | 90 | 0.3 | 20 | 250.0 | |
| | 3 | 1000 | 10 × 2 | 90 | 0.52 | 20 | 500.0 | |
| | 4 | 1000 | 10 × 2 | 90 | 0.4 | 20 | 50.0 | |
| | 5 | 1000 | 10 × 2 | 90 | 0.4 | 20 | 50.0 | |
| | 6 | 46 | F2-4 | | | | 100% cvg | Example 1 |
| | 7 | 60 | F2-4 | | | | 100% cvg | Example 1 |
| | 8 | 100 | F2-4 | | | | 100% cvg | Example 1 |
| | 9 | 150 | F2-4 | | | | 100% cvg | Example 1 |
| | 10 | 60 | F2-4 | | | | 100% cvg | |
| | 11 | 100 | F2-4 | | | | 100% cvg | |
| | 12 | 220 | F2-4 | | | | 100% cvg | |
| | 13 | 1500 | F2-4 | | | | 100% cvg | |

Blasting level, pressure, and distance values are for processing using a direct-pressure type blasting device, and others are for processing using a suction type blasting device.
In the "Nozzle" column, "10 × 2" indicates blasting at an inclination of 15 degree with slit-shaped nozzles (10 mm width × 2 slits), and "F2-4" indicates blasting with an F2-4 gun (manufactured by Fuji Manufacturing Co., Ltd.; diameter 4.0 to 8.0).
Hz, which is the unit of blasting level, indicates the rotation frequency of a disk-type blasting-level adjustment mechanism (for example, see Japanese Unexamined Patent Application, Publication No. 2009-208185), where the same number of Hz indicates that the same amount of abrasive was supplied.
"cvg" under "Processing speed" means coverage.

Experiment to Confirm Visibility Using Circular Zone Plate

Each test piece processed with the blasting conditions described above was placed on a circular zone plate, and the transmission image (circular zone plate) passing through the test piece was imaged. The acquired images are shown in FIGS. 4 to 28.

Imaging was performed with the test piece attached to a camera, and the dimensions 10 mm, 20 mm, and 0 mm in FIGS. 4 to 28 indicate the distance between the circular zone plate and the test piece.

Based on the images of the circular zone plates acquired in this way, test pieces in which it was possible to distinguish 7 or more complete dark rings of the circular zone plate were selected as those having good visibility (Examples 1 to 12), and the difference in surface profile with the other test pieces (Comparative Examples 1 to 13) was compared on the basis of the histogram described above.

Confirmation of Surface Condition Using Histogram

Construction of Histogram and Calculation of Variance ($\sigma^2$)

To construct the histogram described above, the surface of each test piece was imaged at a magnification of 1000× using a laser microscope, and various numerical values were obtained from the laser microscope data.

For the Examples, an ultrahigh-depth shape measurement microscope "VK-8500" and VK surface analysis software "VK-H1A7", both products of Keyence Corp., were used as the laser microscope and analysis software, respectively.

The compartments obtained by dividing the image data into single pixels (actual dimensions 0.21913 μm square) totaled 786,432, in an array of 1024 in the x (column) direction by 768 in the y (row) direction, and 786,432 samples were obtained by measuring the height of each compartment in units of μm to two decimal places.

A histogram was constructed with the heights grouped into bins at intervals of 0.1 μm on the X-axis, and the probability density obtained by dividing the number of samples falling in each bin by 786,432 which is the total number of samples, on the Y-axis. The probability density of the mode was obtained from this histogram.

Then, the variance ($\sigma^2$) was obtained from the following equations, on the basis of the above-described heights X.

$$m = \frac{1}{786,432} \sum_{i=1}^{786,432} Xi$$

$$\sigma^2 = \frac{1}{786,432} \sum_{i=1}^{786,432} (xi - m)^2$$

Measurement Results

Calculation of Mode Probability Density and Variance ($\sigma^2$)

Figure 33:
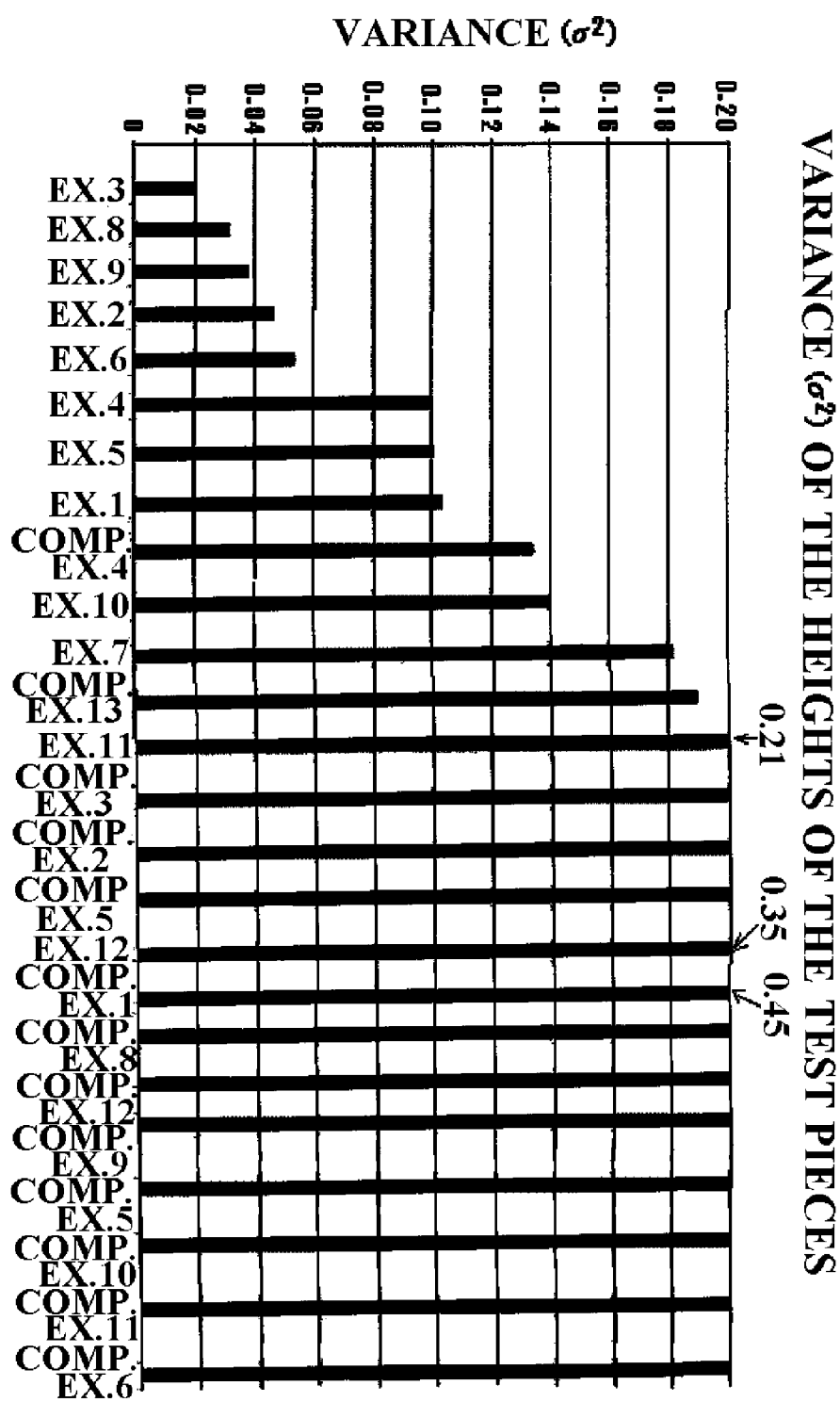
FIG. 33 is a graph showing the variance ($\sigma^2$) of the heights of the test pieces.

Histograms constructed in the manner described above are shown in FIG. 29 to 32. FIG. 33 illustrates a graph showing all of the variances ($\sigma^2$) for each test piece, based on the above equations defining the variance ($\sigma^2$).

As shown in FIGS. 29 to 32, test pieces with a mode probability density in the range 10 to 30% (Examples 1 to 12) all exhibited the desired transparency (see FIGS. 4 to 15). In contrast, for test pieces with mode probability densities of less than 10% (Comparative Examples 2 to 13), or those with mode probability densities of 10 to 30% (see FIG. 32B) but with variances ($\sigma^2$) exceeding 0.4 (μm$^2$) (see FIG. 33), as with Comparative Example 1, the outline of the transmission image was blurred, making it impossible to confirm 7 or more complete dark rings in the circular zone plate, and the transparency was insufficient (see FIGS. 16 to 28).

Surface Roughness Measurement

Figure 34:
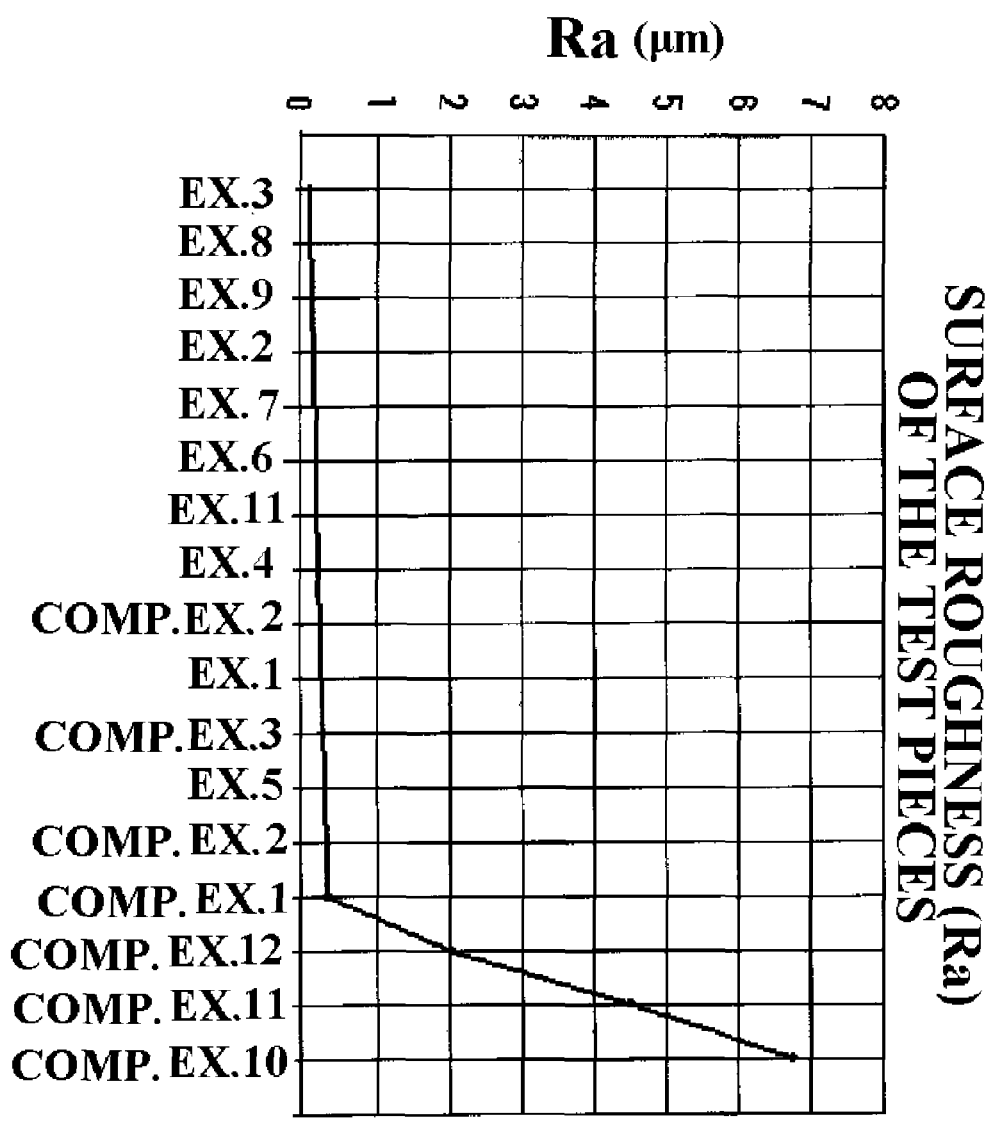
FIG. 34 is a graph showing the surface roughness (Ra) of the test pieces.
Figure 35:
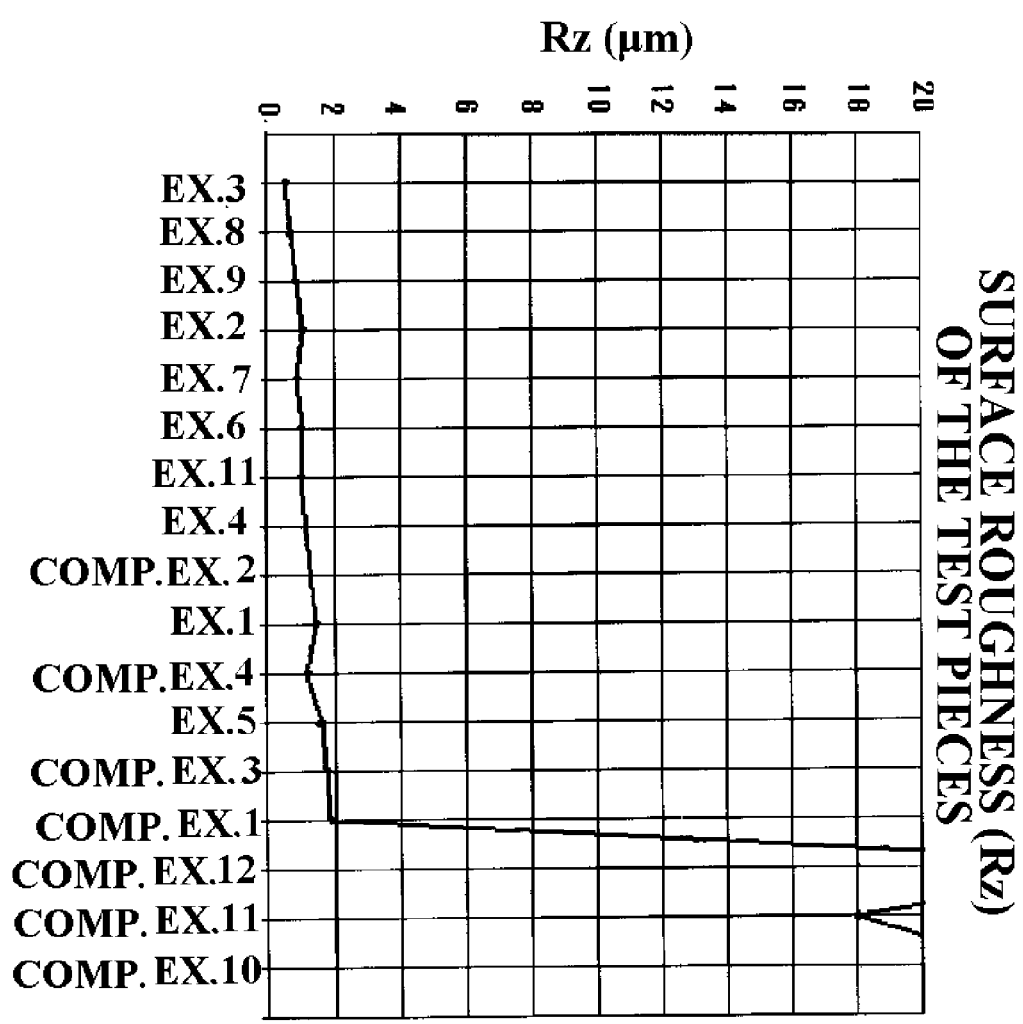
FIG. 35 is a graph showing the surface roughness (Rz) of the test pieces.

The results of measuring the surface roughness of representative test pieces among the test pieces obtained as described above are shown in FIGS. 34 and 35.

All test pieces exhibiting the desired visibility (Examples 1 to 9, 11, and 13) were those with low surface roughness, in terms of Ra or Rz. Ra is 0.5 μm or less, preferably 0.3 μm or less, and more preferably 0.23 μm or less; and Rz is 3 μm or less, preferably 2 μm or less, and more preferably 1.6 μm or less.

Comparative Example 1 having a variance ($\sigma^2$) of 0.43 ($\mu m^2$), exceeding the limit of less than 0.4 ($\mu m^2$) defined in this application, also had comparatively high surface roughness, as compared with the Examples. Such relatively large surface roughness is considered to be the cause of the large variance ($\sigma^2$) in the histogram.

Therefore, as the height difference of the indentations and protrusions formed in the reflecting surface of the light-transmitting member becomes larger, there was a corresponding drop in the image quality of the transmission image, and a surface roughness falling within the above-described numerical range was found to be effective.

Measurement of Optical Characteristics

Figure 36:
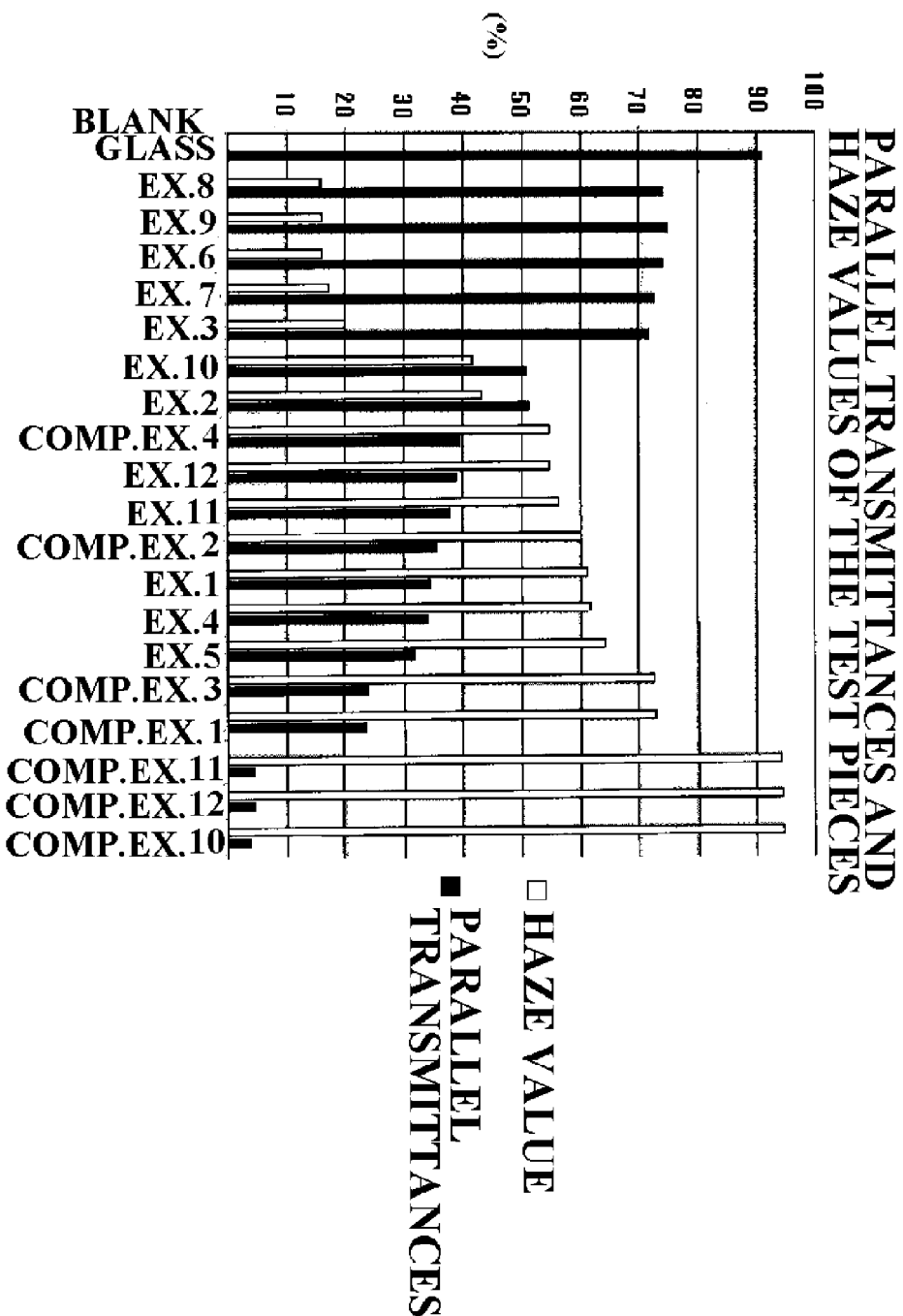
FIG. 36 is a graph showing the parallel transmittances and haze values of the test pieces.
Figure 37:
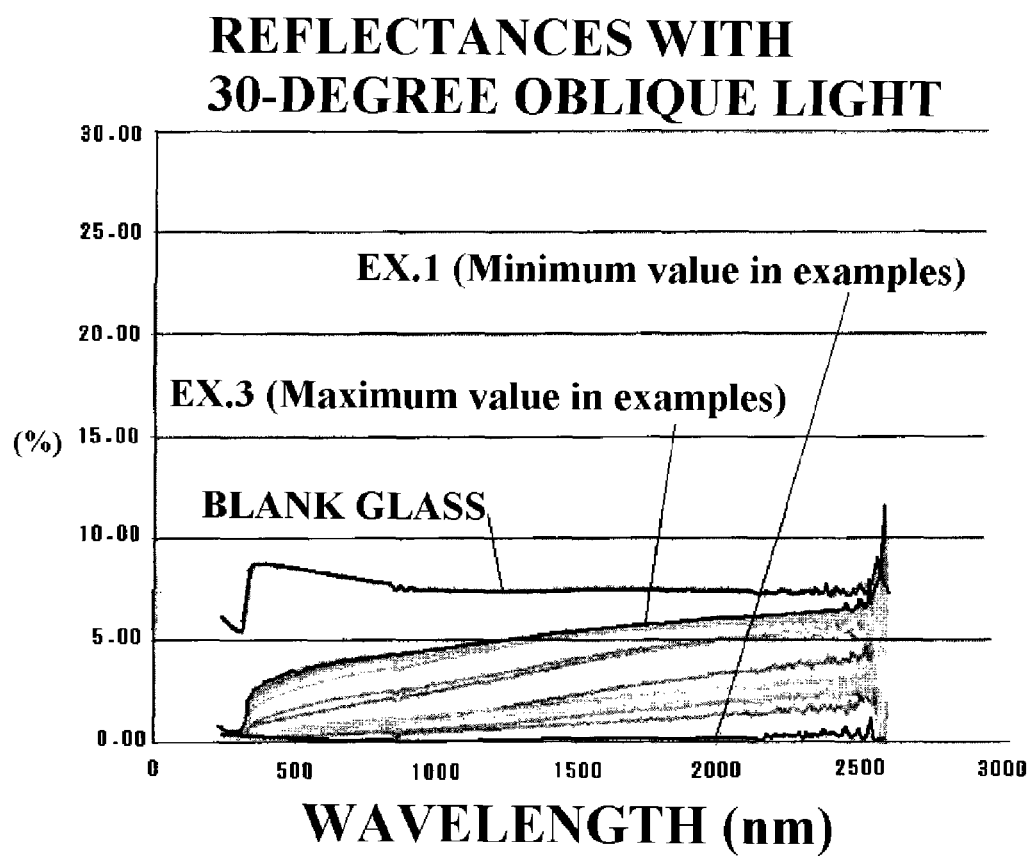
FIG. 37 is a graph showing the reflectances of the test pieces with 30-degree oblique light.

Measurement results of the parallel transmittance and the haze value of each test piece are shown in FIG. 36, and the measurement results of the reflectance with 30-degree oblique light are shown in FIG. 37.

Among the test pieces described above, the test pieces provided with the structure of the present invention (Examples 1 to 12) all had parallel transmittances of 20% or more and haze values of 20 to 70% (see FIG. 36), as well as reflectances of 7% or less at all wavelengths (see FIG. 37). Therefore, it is also shown by the numerical values representing the optical characteristics that the test pieces of the present invention, as well as having antiglare properties due to the decreased reflectance, allowed recognition of transmission images with distinct outlines.

The above-described light-transmitting member of the present invention can be applied to various fields where antiglare treatment is required. Examples of the fields to which it can be applied are given below.

Antiglare Structure for Various Kinds of Display Panels

By directly attaching an antiglare structure of the present invention to a liquid crystal display, a plasma display, an organic EL display, or to a transparent substrate such as a surface protection panel of other display devices, or by attaching a transparent substrate provided with an antiglare structure of the present invention thereto, it is possible to provide a display device which can prevent a drop in visibility due to light glare and in which the outline of the transmission image is sharp.

Surface Protection Panels of Water Heaters and Solar Cells

By applying the antiglare structure of the present invention to the protective panel of a solar cell or water heater, it is possible to provide a protective panel that is capable of transmitting sunlight to the solar cell or water heater with high transmittance, while reducing glare due to reflected light.

In particular, for protective panels of solar cells installed at the central reservations of roads, at airports, etc., such antiglare treatment is required in view of safe operation of cars, aircraft and so forth.

Panels for Greenhouses etc.

Because the present invention maintains high light transmittance while exhibiting antiglare properties, it can be used in the wall panels of greenhouses etc. for agricultural and horticultural purposes. Also, the transmittance and reflectance can be adjusted by means of the surface processing conditions.

Thus the broadest claims that follow are not directed to a machine that is configured in a specific way. Instead, said broadest claims are intended to protect the heart or essence of this breakthrough invention. This invention is clearly new and useful. Moreover, it was not obvious to those of ordinary skill in the art at the time it was made, in view of the prior art when considered as a whole.

Moreover, in view of the revolutionary nature of this invention, it is clearly a pioneering invention. As such, the claims that follow are entitled to very broad interpretation so as to protect the heart of this invention, as a matter of law.

It will thus be seen that the objects set forth above, and those made apparent from the foregoing description, are efficiently attained and since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described;

What is claimed is:

1. A light-transmitting member in which minute hubbly surface profile including indentations and protrusions are formed in a reflecting surface of the light-transmitting member, which is formed of an optically transparent material,
the hubbly surface profile in the reflecting surface being formed so that, when the reflecting surface is divided into minute compartments of a prescribed size and a histogram is constructed on the basis of measurement values obtained by measuring the height of each compartment, the probability density of the mode in the histogram is 10 to 30%, and the variance ($\sigma^2$) in the histogram calculated on the basis of the heights is less than 0.4 ($\mu m^2$).

2. A light-transmitting member according to claim 1, wherein the compartment is a compartment corresponding to one pixel in a 1000-times magnification image acquired by imaging the reflecting surface.

3. A light-transmitting member according to claim 1, wherein the surface roughness of the reflecting surface, in terms of Ra, is 0.5 μm or less.

4. A light-transmitting member according to claim 1, wherein the surface roughness of the reflecting surface in terms of Rz is 3 μm or less.

5. A light-transmitting member according to claim 1, wherein the light-transmitting member is a transparent plate, and the reflecting surface is formed on one surface of the transparent plate.

6. A light-transmitting member according to claim 1, wherein the parallel transmittance is 20% or more, the haze value is 20 to 70%, and the reflectance is 7% or less.

7. A light-transmitting member according to claim 1, wherein flat portions are formed at peaks, and/or between the peaks in the case the flat portions are provided at a fixed ratio which make reflection diffused of the transmission image could be inhibited at this flat portion whereby maintaining a sharp outline to a certain extent in the transmission image.

8. A light-transmitting member according to claim 7, wherein the hubbly surface profile such as indentations and protrusions formed on only one surface, and the flat portion in the hubbly profile formed on the reflecting surface as described above are parallel to the other surface of the transparent plate.

* * * * *